US012652616B2

(12) United States Patent
Ryu et al.

(10) Patent No.: US 12,652,616 B2
(45) Date of Patent: Jun. 9, 2026

(54) PREEMPTION FOR LATENCY-SENSITIVE TRAFFIC

(71) Applicant: NXP USA, Inc., Austin, TX (US)

(72) Inventors: Kiseon Ryu, McLean, VA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 259 days.

(21) Appl. No.: 18/363,351

(22) Filed: Aug. 1, 2023

(65) Prior Publication Data

US 2024/0056968 A1     Feb. 15, 2024

Related U.S. Application Data

(60) Provisional application No. 63/512,214, filed on Jul. 6, 2023, provisional application No. 63/376,083, filed on Sep. 17, 2022, provisional application No. 63/371,045, filed on Aug. 10, 2022.

(51) Int. Cl.
| | |
|---|---|
| *H04W 52/02* | (2009.01) |
| *H04W 72/1263* | (2023.01) |
| *H04W 72/20* | (2023.01) |
| *H04W 72/512* | (2023.01) |
| *H04W 84/12* | (2009.01) |

(52) U.S. Cl.
CPC ... *H04W 52/0216* (2013.01); *H04W 72/1263* (2013.01); *H04W 72/20* (2023.01); *H04W 72/512* (2023.01); *H04W 84/12* (2013.01)

(58) Field of Classification Search
None
See application file for complete search history.

(56) References Cited

U.S. PATENT DOCUMENTS

| | | |
|---|---|---|
| 11,109,395 B2 | 8/2021 | Aboul-Magd et al. |
| 2021/0084667 A1 | 3/2021 | Bravo et al. |
| 2022/0124746 A1 | 4/2022 | Azizi et al. |
| 2022/0330277 A1 | 10/2022 | Canpolat et al. |
| 2023/0308943 A1 * | 9/2023 | Ciochina-Kar ....... H04L 1/1887 |
| 2024/0129952 A1 | 4/2024 | Hedayat et al. |
| 2024/0357656 A1 | 10/2024 | Huang et al. |
| 2025/0254729 A1 | 8/2025 | Kim et al. |

(Continued)

FOREIGN PATENT DOCUMENTS

| | | |
|---|---|---|
| WO | WO2022090441 A1 | 5/2022 |

OTHER PUBLICATIONS

Yang, Boyce Bo et al.; "Further Improve Latency Performance in 11be"; https://mentor.ieee.org/802.11/dcn/21/11-21-0670-00-00be-further-improve-latency-performance-in11 be.pptx(11-21/670r0); Apr. 2021; 13 pages.

(Continued)

*Primary Examiner* — Hong S Cho

(57)     ABSTRACT

One example discloses a method of preemption for latency-sensitive traffic for communications between WLAN (wireless local area network) devices, including: receiving, by an access point (AP), a first frame from a first non-access point station (non-AP STA); transmitting, by the AP, a second frame indicating Transmission Opportunity (TXOP) preemption information to the first non-AP STA; and transmitting, to a second non-AP STA, a third frame; wherein the third frame includes latency-sensitive frame.

23 Claims, 20 Drawing Sheets

600

(56)              References Cited

U.S. PATENT DOCUMENTS

| 2025/0280442 A1 | 9/2025 | Viger et al. |
| 2026/0032717 A1 | 1/2026 | Kishida et al. |

OTHER PUBLICATIONS

IEEE; IEEE P802.11be™/D4.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT): Jul. 2023: 1031 pages.

IEEE; "IEEE P802.11-REVme™/D3.0, Apr. 2023 Draft Standard for Information Technology—Telecommunications and Information Exchange between Systems Local and Metropolitan Area Networks—Specific Requirements Part 11: Wireless LAN Medium Access Control (MAC) and Physical Layer (PHY) Specifications"; Apr. 2023; 5805 pages.

Ryu, Kiseon et al.; "Low Latency Support in UHR"; doc.: IEEE 802.11-23/0018r1; Feb. 2023; 11 pages.

Sedin, Jonas et al.; "Low Latency resource agreements"; Retrieved from internet https://mentor.ieee.org/802.11/dcn/20/11-20-1670-02-00be-low-latency-resource-agreements.pptx (11-20/1670r2) on Jul. 31, 2023; Oct. 2020; 15 pages.

Seok, Yongho et al.; "Low Latency Traffic Report" doc.: IEEE 802.11-23/0798r0; Jul. 2023; 10 pages.

Lee, Wook Bong et al.; "Thoughts on Beyond 802.11be"; https://mentor.ieee.org/802.11/dcn/22/11-22-0932-00-0wng-thoughts-on-beyond-802-11be.pptx (11-22/932r0); Jul. 2022; 13 pages.

U.S. Appl. No. 18/490,276; Non-Final Office Action mailed Mar. 11, 2026; 28 pages.

U.S. Appl. No. 18/490,276; Filed Oct. 19, 2023; 43 pages.

U.S. Appl. No. 18/482,533; Filed Oct. 6, 2023; 40 pages.

IEEE; "IEEE P802.11be™M/D2.2, Draft Standard for Information technology-Telecommunications and information exchange between systems Local and metropolitan area networks-Specific requirements, Part 11: Wireless LAN Medium Access Control (MAC) and Physical Layer (PHY) Specifications, Amendment 8: Enhancements for extremely high throughput (EHT)"; Oct. 2022; 923 pages.

* cited by examiner

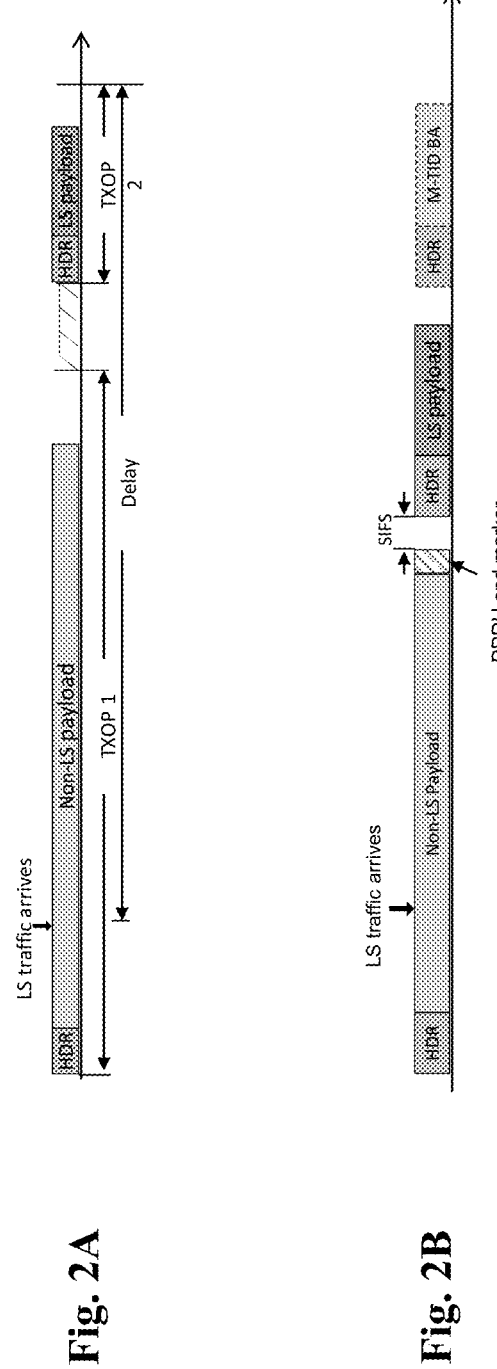
Fig. 2A
Fig. 2B

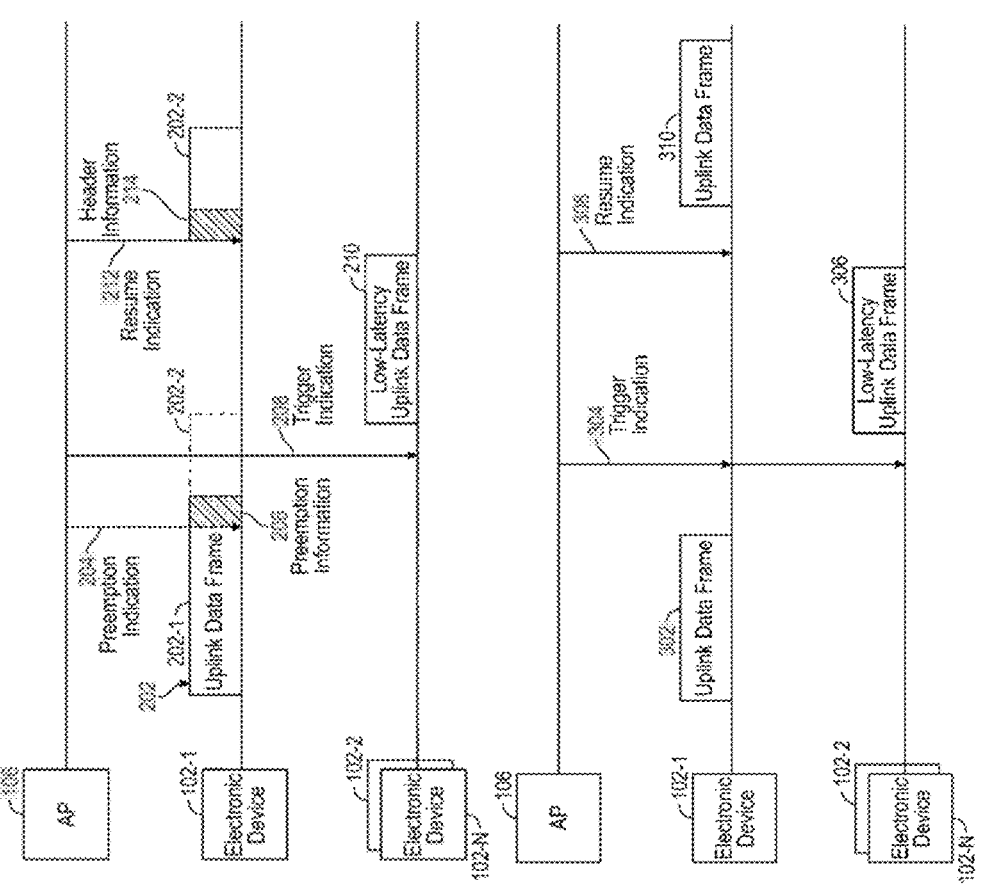
Fig. 3A
Fig. 3B

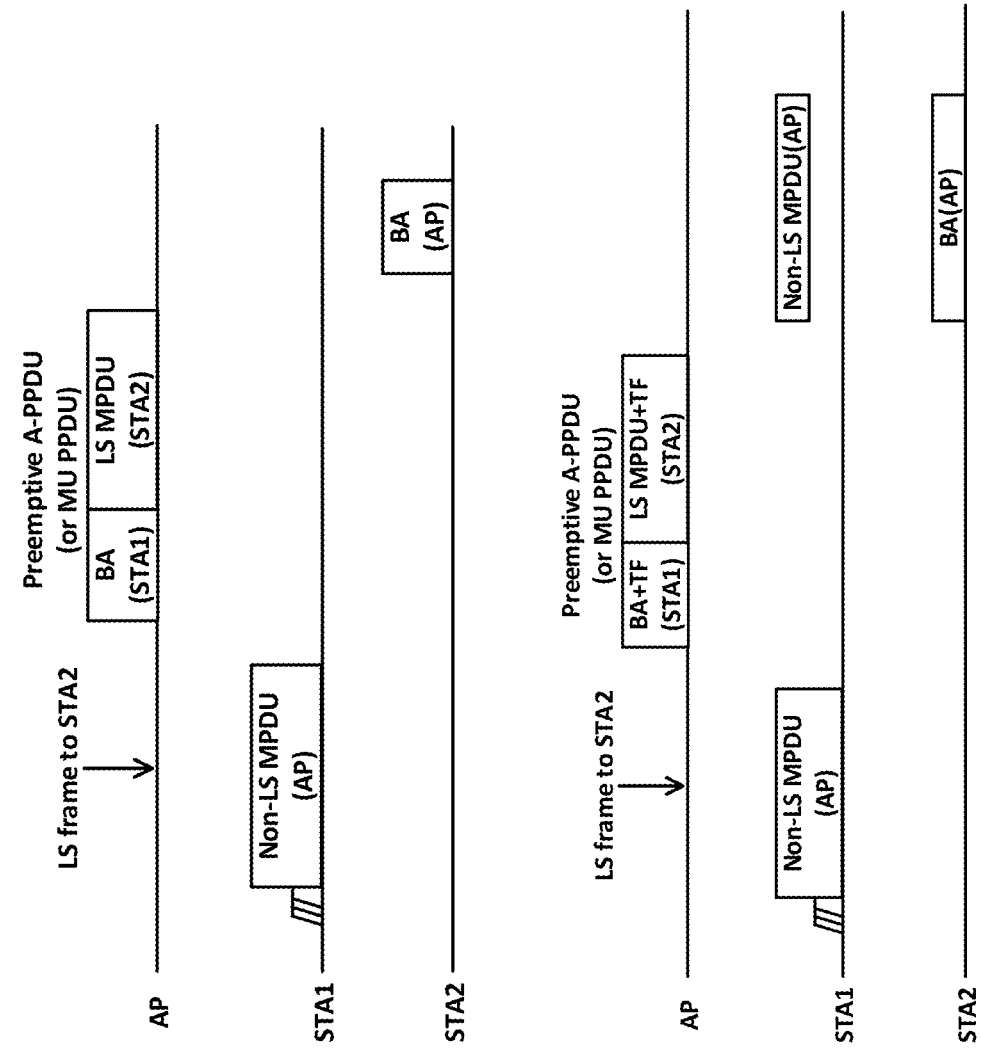
Fig. 4C
Fig. 4D

400

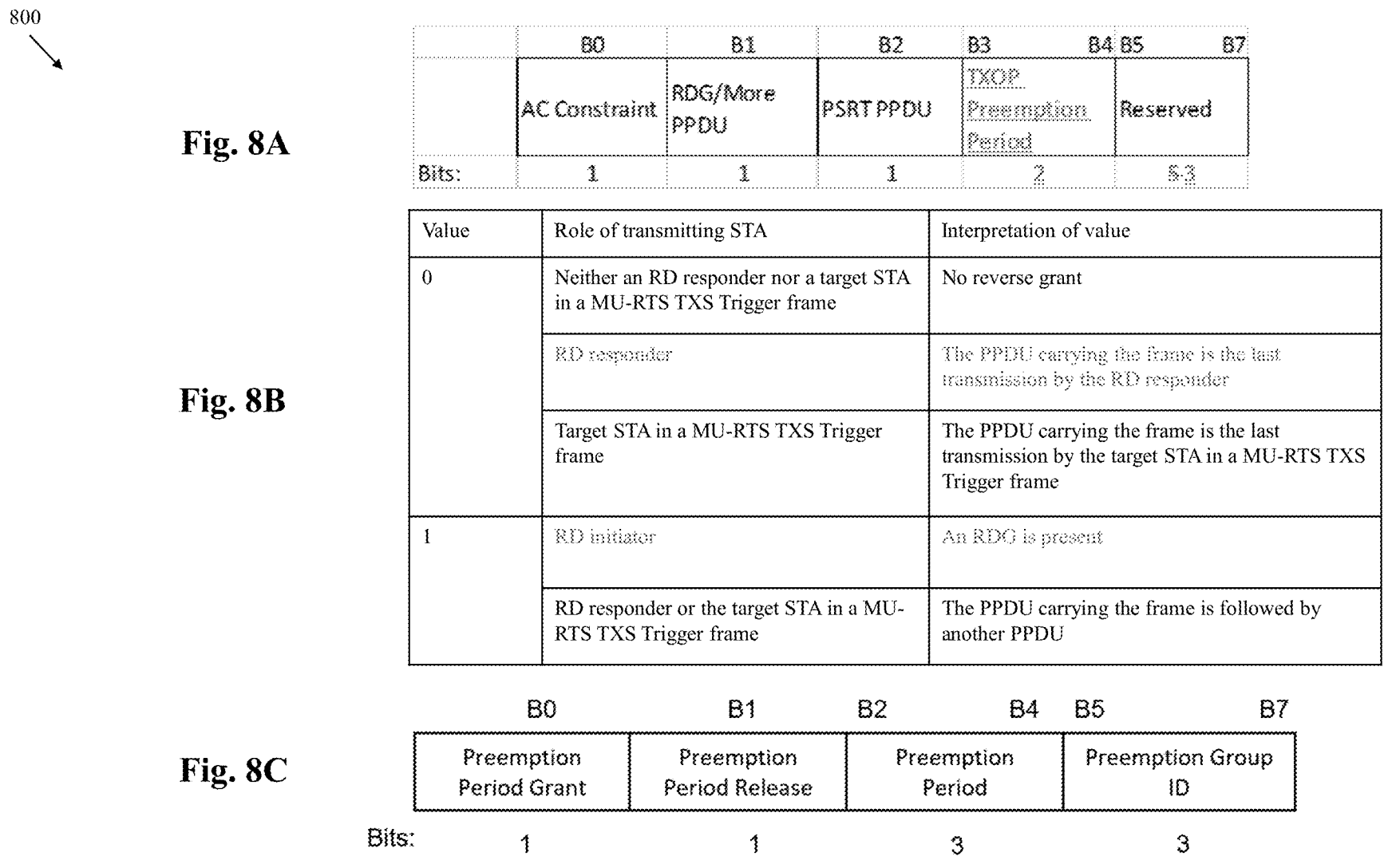

800

| | B0 | B1 | B2 | B3 | B4 B5 | B7 |
|---|---|---|---|---|---|---|
| | AC Constraint | RDG/More PPDU | PSRT PPDU | TXOP Preemption Period | | Reserved |
| Bits: | 1 | 1 | 1 | 2 | | 5:3 |

Fig. 8A

| Value | Role of transmitting STA | Interpretation of value |
|---|---|---|
| 0 | Neither an RD responder nor a target STA in a MU-RTS TXS Trigger frame | No reverse grant |
| | RD responder | The PPDU carrying the frame is the last transmission by the RD responder |
| | Target STA in a MU-RTS TXS Trigger frame | The PPDU carrying the frame is the last transmission by the target STA in a MU-RTS TXS Trigger frame |
| 1 | RD initiator | An RDG is present |
| | RD responder or the target STA in a MU-RTS TXS Trigger frame | The PPDU carrying the frame is followed by another PPDU |

Fig. 8B

| B0 | B1 | B2 | B3 | B4 | B5 | | B7 |
|---|---|---|---|---|---|---|---|
| Preemption Period Grant | Preemption Period Release | | Preemption Period | | | Preemption Group ID | |
| 1 | 1 | | 3 | | | 3 | |

Bits:

Fig. 8C

TPN: TXOP Preemption Notification
BSRP TF: Buffer Status Report Poll Trigger frame
BSR: Buffer Status Report
LL: Low Latency MPDU
BA: Block Ack TPG: TXOP Preemption Group
TPN: TXOP Preemption Notification
BSRP TF: Buffer Status Report Poll Trigger frame
LL: Low Latency MPDU
Non-LL: Non-Low Latency MPDU
BA: Block Ack
M-BA: Multi-STA Block Ack

900

1000

1100

PREEMPTION FOR LATENCY-SENSITIVE TRAFFIC

REFERENCE TO PROVISIONAL APPLICATIONS TO CLAIM PRIORITY

A priority date for this present U.S. patent application has been established by prior U.S. Provisional Patent Application, Ser. No. 63/371,045, filed on 10 Aug. 2022, and commonly assigned to NXP USA, Inc. A priority date for this present U.S. patent application has been established by prior U.S. Provisional Patent Application, Ser. No. 63/376, 083, filed on 17 Sep. 2022, and commonly assigned to NXP USA, Inc. A priority date for this present U.S. patent application has been established by prior U.S. Provisional Patent Application, Ser. No. 63/512,214, filed on 6 Jul. 2023, and commonly assigned to NXP USA, Inc.

The present specification relates to systems, methods, apparatuses, devices, articles of manufacture and instructions for managing latency-sensitive traffic.

SUMMARY

According to an example embodiment, a method of preemption for latency-sensitive traffic for communications between WLAN (wireless local area network) devices, comprising: receiving, by an access point (AP), a first frame from a first non-access point station (non-AP STA); transmitting, by the AP, a second frame indicating Transmission Opportunity (TXOP) pre-emption information to the first non-AP STA; and transmitting, to a second non-AP STA, a third frame; wherein the third frame includes latency-sensitive frame.

In another example embodiment, the TXOP pre-emption information is included in a BlockAck (BA) frame in response to the first frame.

In another example embodiment, the TXOP pre-emption information is included in a QoS Null frame; and the QoS Null frame includes an HE-Control subfield.

In another example embodiment, further comprising that the first non-AP STA suspends its frame transmission after receiving the second frame indicating TXOP preemption information.

In another example embodiment, further comprising that the AP transmits a fourth frame indicating TXOP preemption release to the first non-AP STA after successful transmission of the third frame.

In another example embodiment, further comprising that the first non-AP STA resumes its transmission after receiving the fourth frame from the AP.

In another example embodiment, obtaining, by the first non-AP STA, a TXOP; transmitting, by the first non-AP STA to the AP, a first frame indicating a time period; wherein the time period is allocated for the AP to schedule a downlink or uplink low latency traffic transmission; and transmitting, by the first non-AP STA to the AP, a second frame that has been buffered at the first non-AP STA during the TXOP, when the time period has expired or a third frame indicating a release of the time period is received.

In another example embodiment, the time period is allocated at a beginning of the TXOP or at a beginning of a restricted target wake time service period.

In another example embodiment, the time period is less than a predetermined time period within the TXOP.

In another example embodiment, the first frame is a QoS Null frame that includes a HE-Control subfield.

In another example embodiment, the first frame is transmitted when the TXOP length is longer than a predetermined time period.

In another example embodiment, the third frame is a QoS Null frame that includes a HE-Control subfield.

In another example embodiment, further comprising, transmitting the first frame, by the non-AP STA, based on group or membership subscription.

In another example embodiment, the first or second non-AP STAs belong to a same group or membership with the first non-AP STA.

In another example embodiment, receiving, by the AP from the first non-AP STA, a first frame indicating a time period; the time period is allocated within a TXOP for the AP to schedule a downlink or uplink low latency traffic transmission; transmitting, by the AP, downlink low latency traffic or a trigger frame to solicit uplink low latency traffic from the first non-AP STA or the second non-AP STA during the time period; and receiving by the AP from the first non-AP STA, a second frame that has been buffered at the first non-AP STA during the TXOP when the time period has expired or a third frame indicating a release of the time period is transmitted.

In another example embodiment, receiving, by the AP, a first frame from the first non-AP STA, wherein the first frame solicits an immediate control response frame; transmitting, by the AP, a second frame including a TXOP pre-emption indication to the first non-AP STA, wherein the second frame is the immediate control response frame; transmitting, by the AP, to the second non-AP STA a third frame, wherein the third frame includes low latency frame; and transmitting, by the AP, to the first non-AP STA a fourth frame, wherein the fourth frame indicates TXOP return to the first non-AP STA.

In another example embodiment, the TXOP pre-emption information is included in at least one of the following immediate response frames in response to the first frame: an Ack frame; a BA (BlockAck) frame; or a CTS frame.

In another example embodiment, the TXOP pre-emption indication is indicated in at least one of the following MAC control header field and/or subfield: a duration field; and/or a duration/id field and a more data subfield.

In another example embodiment, the duration/id field is set to 0 and/or the more data subfield is set to 1.

According to an example embodiment, a method comprising: transmitting, to a first non-access point station (non-AP STA), a first frame, wherein the first frame includes non-latency-sensitive frame; transmitting, to the first non-AP STA, a second frame indicating a PHY Protocol Data Unit (PPDU) pre-emption information; and transmitting, to a second non-AP STA, a third frame, wherein the third frame includes latency-sensitive frame.

In another example embodiment, the first frame and the second frame are carried in a same PPDU.

In another example embodiment, the second frame is a QoS Null frame including an HE-Control subfield.

In another example embodiment, the PPDU pre-emption information includes Ack Policy update information indicating the Ack Policy of the first frame being changed to Block Ack (BA).

In another example embodiment, the PPDU pre-emption information includes target recipient information of the third frame indicating whether the second non-AP STA is the same as the first non-AP STA.

According to an example embodiment, a first WLAN (wireless local area network) device configured as an access point (AP), comprising: a controller configured define a preemption protocol for latency-sensitive traffic; wherein the controller is configured to: receive a first frame from a first non-access point station (non-AP STA), wherein the first frame is a non-latency-sensitive frame; transmit a second frame indicating Transmission Opportunity (TXOP) pre-emption information to the first non-AP STA; and transmit to a second non-AP STA, a third frame, wherein the third frame includes latency-sensitive frame.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIGS. 2A, 2B represent an example response to latency-sensitive traffic.

FIGS. 3A, 3B represent another example response to latency-sensitive traffic.

FIGS. 4A, 4B, 4C, 4D, 4E represent a first example latency-sensitive traffic preemption protocol.

FIGS. 8A, 8B, 8C present example signaling protocols for the TXOP preemption notification.

Figure 1:
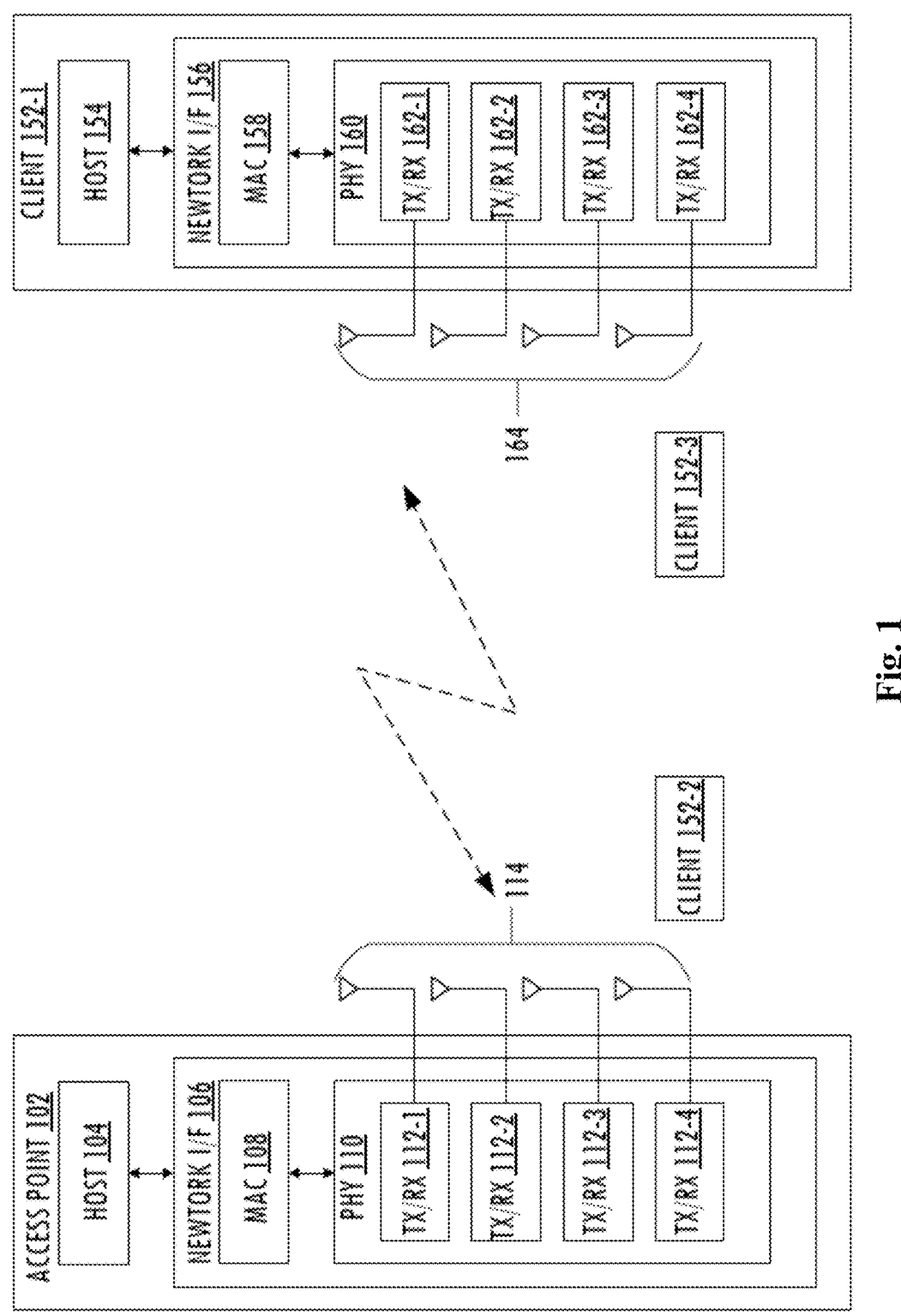
FIG. 1 represents a first example wireless communications network (WLAN).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g., Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols (i.e. be standards compliant) so that various network devices can communicate. These protocols are not static and are modified (e.g., different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth].

FIG. 1 represents a first example 100 wireless communications network (WLAN) formed by a first set of wireless communications devices (i.e. AP STAs and Client-STAs). The WLAN 100 includes access point station (AP STA) 102 and a set of non-AP stations (non-AP/Client STAs) 152-1, 152-2, and 152-3.

The AP 102 includes host processor 104 (e.g., controller) coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor 108 and physical layer (PHY) processor 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154 (e.g., controller), network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs, encapsulate the MAC SDUs into a special PDU called a PPDU (physical layer protocol data units) by adding a preamble.

The preamble (i.e. TXVECTOR, transmission vector) specifies the PPDU's transmission format (i.e. which IEEE protocol (e.g., EHT, HE, etc.) has been used to pack the SDU data payload). The PPDU preambles may include various training fields (e.g., predetermined attributes) that are used by the receiving APs or STAs to perform synchronization, gain control, estimate channel characteristics, and signal equalization. The AP 102 and STA 152-1 then exchange the PPDU formatted wireless communications signals 116.

During exchange of wireless communications traffic, either the AP STA 102 or the non-AP STAs 152-1, 152-2, 152-3 may alternate between being a transmission opportunity (TXOP) holder and a TXOP responder.

Often a TXOP holder is transmitting non-latency-sensitive traffic when latency-sensitive traffic arrives from a TXOP responder. In such a case, latency-sensitive traffic has to wait until the TXOP ends and contends the channel again, which may cause critical delay for the latency-sensitive traffic.

One approach to responding to such a latency-sensitive traffic problem is where PPDU preemption by a TXOP holder where a recipient device of the latency-sensitive traffic is same as a recipient device of the non-latency-sensitive traffic transmitted from the TXOP holder.

For example, when the TXOP holder is transmitting non-latency-sensitive frame to device A and has newly buffered latency-sensitive frame to be delivered to device B, the TXOP holder can transmit the latency-sensitive frame to device B after transmitting the non-latency-sensitive frame to device A and receiving an acknowledgement frame in response to the non-latency-sensitive frame from device A, which results in delay of the latency-sensitive frame transmission to device B.

Also if the TXOP holder preempts PPDU for latency-sensitive frame, the device A can't transmit acknowledgement frame right after receiving the latency-sensitive frame since it is not addressed to the device A, which causes a problem on acknowledgement procedure.

Another approach to responding to such a latency-sensitive traffic problem is TXOP preemption by an AP as a TXOP responder where the AP triggers latency-sensitive traffic from other devices using the preemptive TXOP. However, the AP may not get the information about latency-sensitive traffic buffered at other devices before or at the same time during the preempted TXOP. Additionally, if the AP is receiving non-latency-sensitive frame from the TXOP holder and it has newly buffered latency-sensitive frame to be delivered to another device during a TXOP, then the AP has to contend the channel access to transmit the latency-sensitive frame after the TXOP end, which also causes delay of the latency-sensitive traffic.

FIGS. 2A, 2B represent an example 200 response to latency-sensitive traffic. In FIG. 2A (e.g., IEEE 802.11-21/670) a TXOP holder is transmitting non-latency-sensitive traffic when latency-sensitive traffic arrives. In this case, latency-sensitive traffic has to wait until the TXOP ends and contends the channel again. FIG. 2B shows a possible way for reducing delay of latency-sensitive traffic, by introducing a pre-emptible PPDU so that latency-sensitive traffic can be sent in current TXOP. Then a transmitter can end the ongoing PPDU after the nearest segment with a PPDU end marker, and then send latency-sensitive traffic within the TXOP. The PPDU end marker could be a rotation of L-LTF or some other predefined sequences. The receiver would not send a BA and expect to receive a latency-sensitive PPDU after SIFS when a PPDU sequence end marker is detected at the end of a PPDU.

However, if the pre-emptive PPDU (with the latency-sensitive payload) is transmitted to other device, the receiver device of the pre-empted PPDU (with the non-latency-sensitive payload) can't transmit a BA (BlockAck) frame in response to the non-latency-sensitive payload right after the pre-emptive PPDU.

FIGS. 3A, 3B represent another example 300 response to latency-sensitive traffic. In FIG. 3A cited U.S. Ser. No. 11/109,395B2 is shown. Here an AP (TXOP responder) transmits a preemption indication to a TXOP holder and the TXOP holder suspends its transmission. The AP then triggers a low latency frame transmission from other STA, before transmitting a resume indication to the TXOP holder and the TXOP holder resumes its transmission of the buffered non-low latency frame. FIG. 3B however shows that if the AP is receiving a non-latency-sensitive frame from the TXOP holder and the AP has a newly buffered latency-sensitive frame to be delivered to another device during a TXOP, the AP has to contend the channel access to transmit the latency-sensitive frame after the TXOP end, which causes delay of the latency-sensitive traffic.

In yet other approaches, if a non-AP STA operates in an Intra-PPDU power save mode, the non-AP STA in such a doze state may not receive a latency-sensitive frame from an AP when the AP transmits the preemptive PPDU addressed to the STA. For example, in a cited current draft specification ([1] IEEE 802.11REVme D1.3), Intra-PPDU power save is described as follows. Intra-PPDU power save is the power save mechanism for an HE STA to enter the doze state or become unavailable until the end of a received PPDU that is identified as an Intra-BSS PPDU. The STA can enter the doze state if it is in PS mode and can become unavailable if it is in active mode (see 11.2.3.2 (Non-AP STA power management modes)). A non-AP HE STA that has dot11IntraPPDUPowerSaveOptionActivated equal to true operates in Intra-PPDU power save mode. A non-AP HE STA that is in Intra-PPDU power save mode and has entered doze state or has become unavailable shall continue to operate its NAV timers and to consider the medium busy and shall transition to the awake state at the end of the PPDU.

A problem however is that if the AP performs PPDU or TXOP preemption for latency-sensitive frame transmission to a STA operating in Intra-PPDU power save, after identifying a received PPDU as an Intra-BSS PPDU the STA may enter doze state and it may not receive the latency-sensitive frame from the AP when the AP transmits the preemptive PPDU addressed to the STA.

Now discussed are various example embodiments for effecting latency-sensitive traffic preemption.

FIGS. 4A, 4B, 4C, 4D, 4E represent a first example latency-sensitive traffic preemption protocol 400. In the first protocol 400 an AP (e.g., TXOP responder) transmits a preemption PPDU including latency-sensitive MPDUs to a set of non-AP STAs when it receives a non-latency-sensitive frame from a non-AP STA (e.g., a TXOP holder). Additionally a TXOP pre-emption request is added to an immediate response control frame, such as a BA (BlockAck) frame, in response to receiving the non-latency-sensitive frame or in in response to receiving a QoS Null frame including a HE-Control subfield. The immediate response control frame information can include time period information indicating a pre-emption interval. The immediate response control frame information can also include target recipient information of the preemption PPDU indicating which non-AP STA the preemption PPDU is addressed to. Using such the first protocol 400 Intra-PPDU power save for latency-sensitive traffic can be disabled. After finishing transmission of latency sensitive frame, the AP can transmit, to the non-AP STA that is the TXOP holder, a frame indicating TXOP pre-emption release (e.g., a QoS null frame with the RDG/More PPDU subfield in the CAS Control subfield set to 0). Upon receiving of the frame indicating the TXOP pre-emption release, the non-AP STA that is the TXOP holder can resume its transmission during the remaining TXOP.

For example, and as shown in FIGS. 4A, 4B, 4C, 4D, 4E, if a non-AP STA is the TXOP holder (e.g., STA1) transmits a non-latency-sensitive data frame to a TXOP responder (e.g., AP) and the TXOP responder (e.g., AP) needs to transmit a latency-sensitive data frame to the TXOP holder (e.g., STA1) or to other STA (e.g., STA2), the TXOP responder should be allowed to transmit a preemptive PPDU. Preemption request information is included in a control response frame such as a BA frame, or a QoS Null frame including an HE-Control subfield.

In the examples shown, a TXOP holder transmits a non-latency-sensitive frame. TXOP responder responds with a BA including preemption request information, or a BA+QoS Null frame indicating preemption request. While the preemption request might look like a Reverse Direction Grant (RDG) protocol message, the preemption request instead has an opposite direction (i.e., TXOP responder to TXOP holder).

Preemption request information can include preemption time period info such as a preemptive PPDU length, a preemption time period, etc. Preemption request information can include one bit indication indicating whether a target recipient of the preemptive PPDU is the TXOP holder or not. If the target recipient of the preemptive PPDU is not the TXOP holder, the TXOP holder may be in doze state and need to wake during the preemption period. The TXOP responder transmits a latency-sensitive frame to the TXOP holder or to other device.

Figures 4A, 4B:
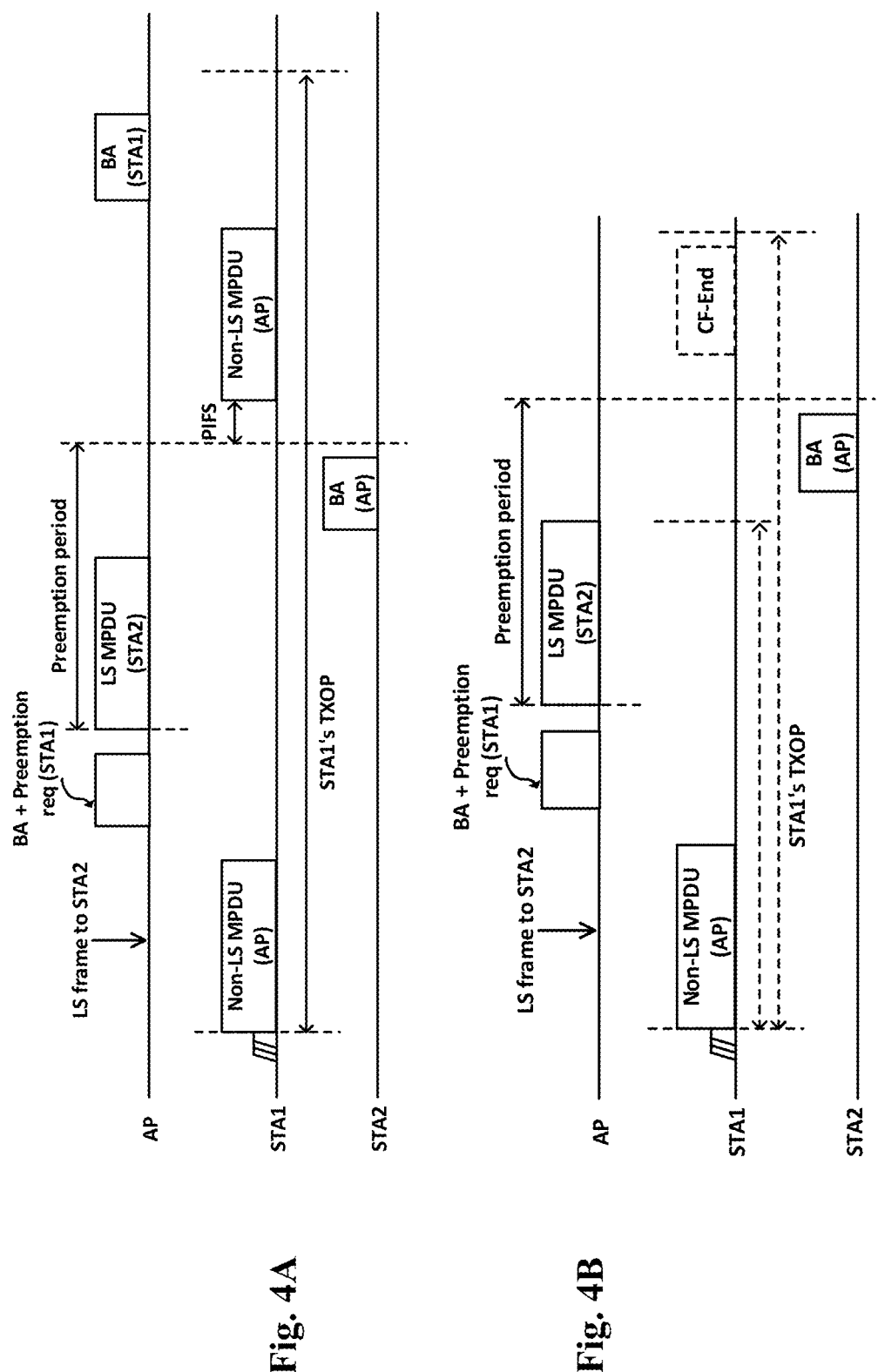
Figure 4E:
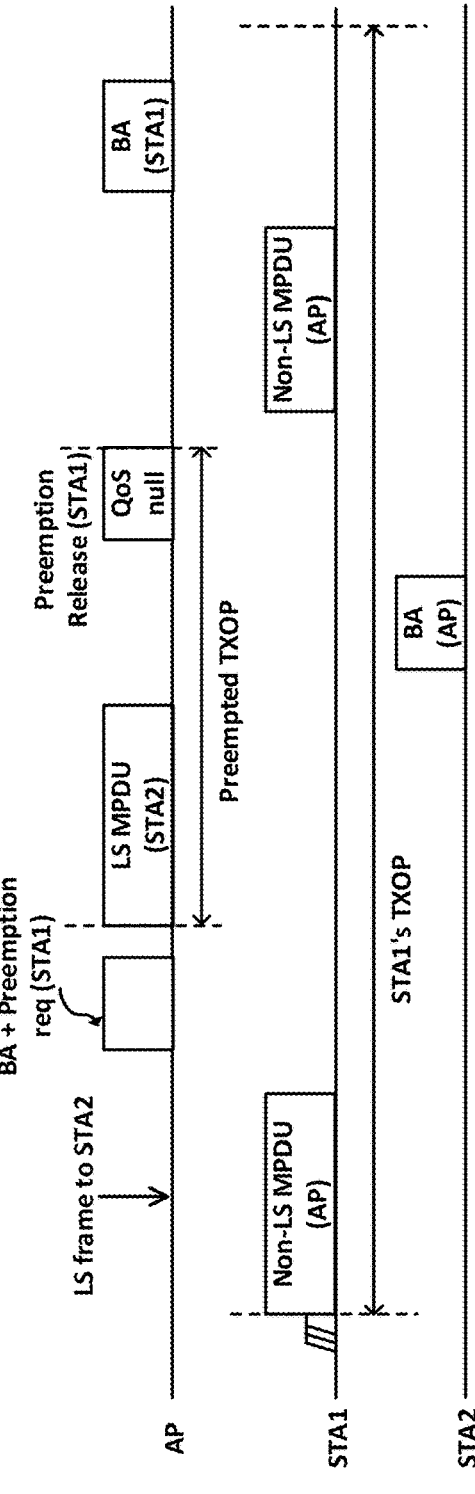

Upon expiration of the preemption time period, or alternatively if there is no explicit preemption time period, receiving of the RDG/More PPDU subfield in the CAS Control subfield set to 0, the TXOP holder can transmit the remaining buffered non-latency-sensitive frame to the TXOP responder (see FIG. 4E). For this case, the related TXOP duration can be extended. Instead of transmitting the remaining buffered frame during the remaining TXOP, the TXOP holder may terminate the TXOP and transmit it during a newly obtained TXOP. If AP preempts the TXOP of a STA, the AP may schedule the STA by transmitting a Trigger frame within a certain time interval in a separate TXOP.

Note. This is similar to RDG or TXS return procedure in the current draft (IEEE 802.11be D2.1), but the proposal provides a method for preemption request (or indication) from a TXOP responder in a TXOP for low latency traffic, which is different from TXOP holder granting RDG and TXS return by TXOP responder.

To define a control signaling indicating a preemption request, at least one of the following approaches can be used.

First, to re-use the CAS Control subfield using one reserved bit to indicate preemption request in the CAS Control subfield. This is a simple solution, however there are only 5 bits reserved, which may be not enough to include more information such as a preemption time period, a target recipient information, etc.

Second, define a new "A-" Control subfield. The new subfield can include more information such as preemption time period, and target recipient information, etc.; however this approach would require defining a new control signaling subfield.

Third, use one reserved bit in the BA (Block Ack) frame.

Additionally as shown in FIG. 4A, when after sending the preemption request, if the remaining TXOP is greater than the preemption period, and the TXOP holder can transmit a frame within the remaining TXOP, then the TXOP holder (STA1) may transmit a non-latency-sensitive frame within the remaining TXOP However if as shown in FIG. 4B when after sending the preemption request, if the remaining TXOP less than or equal to the preemption period, or the remaining TXOP is not enough long to transmit a Data frame, then the TXOP holder (STA1) shall not transmit a non-latency-sensitive frame and it may transmit a CF-End frame.

FIG. 4C, 4D show examples of TXOP responder preemption using either A-PPDU or MU PPDU frames. These examples are similar to FIG. 4B where the AP is the TXOP responder, STA1 is the TXOP holder, and STA2 is the Recipient of the latency-sensitive frame. However, instead of transmitting a control frame including the preemption request and a latency-sensitive frame separately, a BA frame in response to the frame sent by STA1 and a latency-sensitive frame can be transmitted by the AP in an A-PPDU or an MU PPDU.

For this case, Trigger frames can be included in the A-PPDU or the MU PPDU to solicit a Trigger-Based (TB) PPDU including a BA frame from STA2 and the TB PPDU for the remaining non-latency-sensitive frame from STA1.

FIG. 4E shows an example of that the AP (i.e., TXOP responder) returns a preempted TXOP to the non-AP STA (i.e., TXOP holder) by transmitting a frame indicating TXOP preemption release after finishing transmission of its buffered latency sensitive frame for TXOP preemption.

Just discussed above is TXOP preemption by a TXOP responder (e.g., AP). To review, TXOP responder (e.g., AP) may request TXOP preemption to a TXOP holder (e.g., non-AP STA) to transmit downlink buffered low latency traffic, which is applied to the downlink (DL) low latency traffic transmission by TXOP preemption, since the TXOP responder (e.g., AP) may not have clear information about uplink (UL) buffered low latency traffic when the TXOP is preempted.

However, in many example embodiments, such a protocol can be applied only for downlink (DL) low latency traffic transmission by TXOP preemption, since the TXOP responder (e.g., AP) may not have clear information about uplink (UL) buffered low latency traffic when the TXOP is preempted. TXOP preemption request done after receiving a PPDU from the TXOP holder, may cause latency in the case of receiving a long PPDU from the TXOP holder. Additionally if low latency traffic is generated/buffered among r-TWT scheduled STAs and r-TWT scheduling AP outside of the r-TWT service period (SP), it may cause critical latency to transmit the low latency traffic in timely manner.

Figure 5:
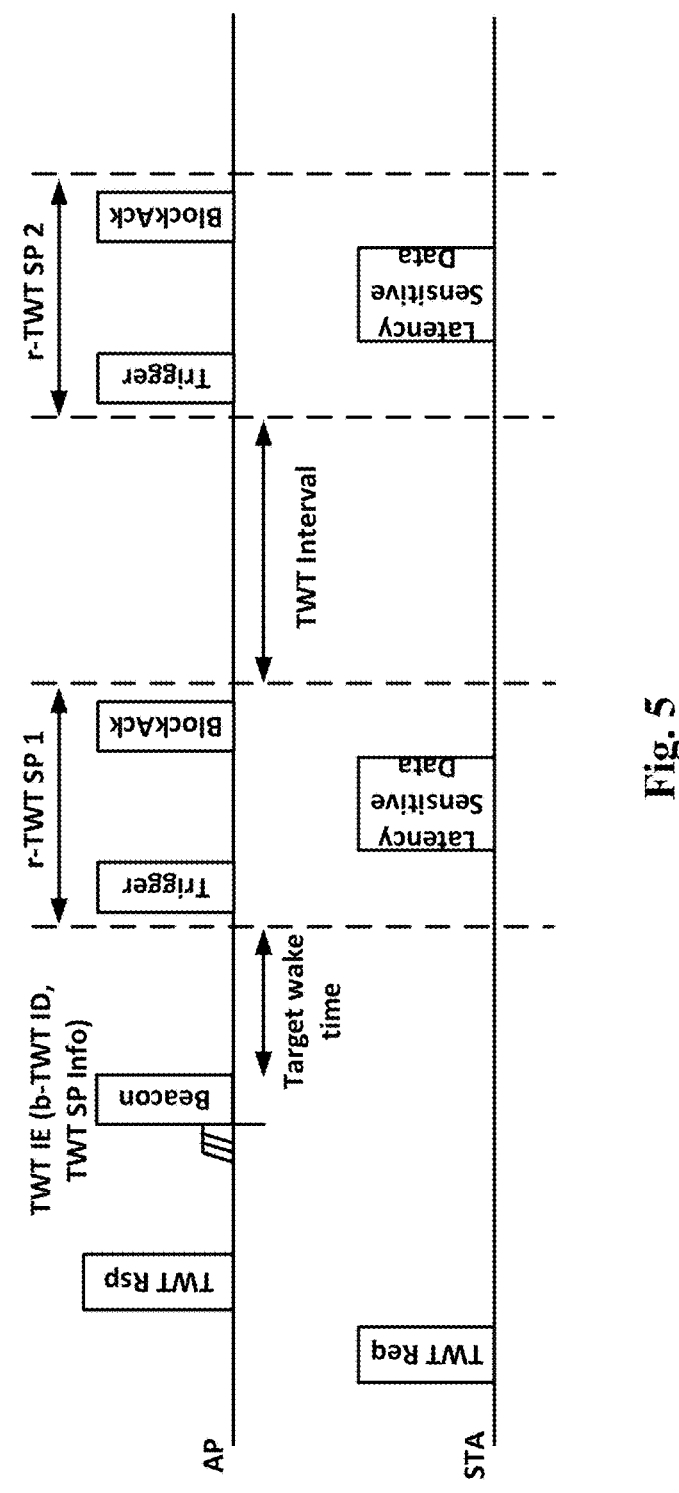
FIG. 5 represents an example of using Restricted Target Wake Time.

FIG. 5 represents an example 500 of using Restricted Target Wake Time. In IEEE802.11be, restricted target wake time (r-TWT) is defined for low latency traffic, which can be efficient for the AP to schedule periodically generated low latency traffic. If low latency traffic is generated/buffered among r-TWT scheduled STAs and r-TWT scheduling AP outside of the r-TWT service period (SP), it may cause critical latency to transmit the low latency traffic in timely manner. If low latency traffic can be scheduled with high priority regardless of the preconfigured r-TWT SP, it will improve the latency of the low latency traffic An r-TWT agreement is established between a STA and an AP using TWT setup frames containing a broadcast TWT element that includes: latency-sensitive UL/DL TID information associated with the r-TWT; and a broadcast TWT ID identifying a membership group. An r-TWT service period (SP) schedule can be announced by a beacon frame.

Figure 6:
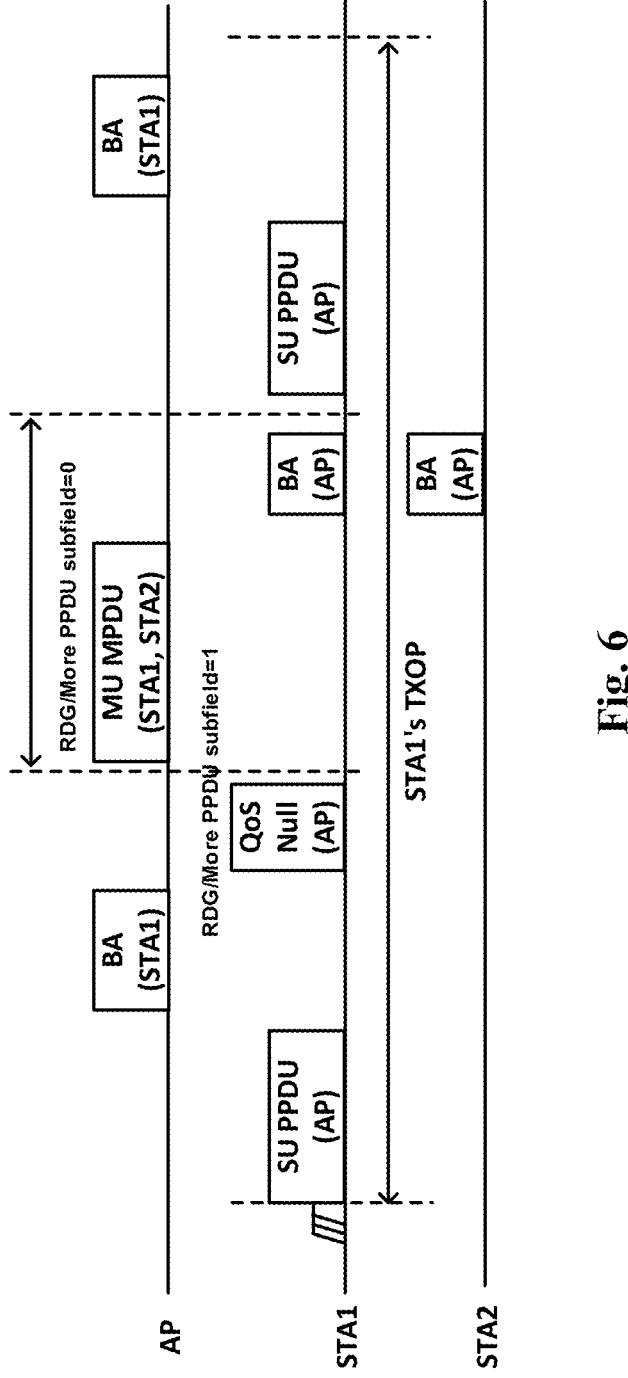
FIG. 6 represents an example of using a Reverse Direction Grant (RDG) Protocol.

FIG. 6 represents an example 600 of using a Reverse Direction Grant (RDG) Protocol. In IEEE802.11be, RDG can be used for a TXOP holder to give its obtained TXOP to a TXOP responder. It can be used when the TXOP responder has buffered data addressed to the TXOP holder, regardless of low latency traffic. RDG is up to a TXOP holder decision, and the TXOP holder is not required to do RDG within its TXOP. Using RDG (without a new rule/policy), it is difficult to schedule low latency traffic for non-TXOP holder/responder STA in a timely manner. RD initiator (TXOP holder, STA1) may grant reverse direction by transmitting a frame including the RDG/More PPDU subfield set to 1. RD responder (TXOP responder, AP) receiving the frame including the RDG/More PPDU subfield set to 1 may transmit a frame during the TXOP. If the RD responder set the RDG/More PPDU subfield to 0, the RD initiator may transmit a frame during the remaining TXOP.

Figure 7:
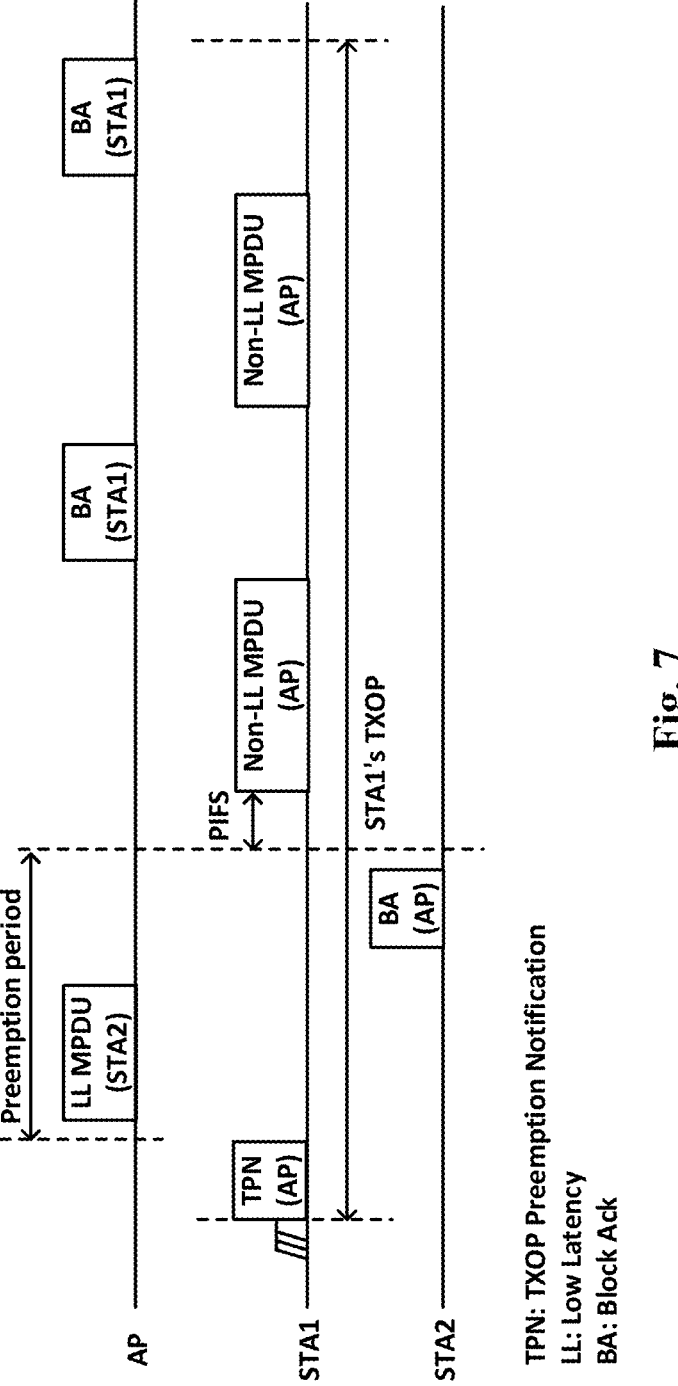
FIG. 7 presents an example protocol for TXOP preemption notification.

FIG. 7 presents an example 700 protocol for TXOP preemption notification. This TXOP preemption notification to be discussed applies to both DL and UL low latency traffic transmission within any TXOP obtained by a non-AP STA. By using an allocated TXOP preemption period within a TXOP obtained by a non-AP STA, an AP can schedule DL/UL low latency traffic transmission within the allocated TXOP preemption period. The TXOP preemption period can be allocated at the beginning of the TXOP in order to reduce the latency of the low latency traffic.

Within a TXOP, a TXOP preemption period may be assigned dynamically for low latency traffic by a TXOP holder at the beginning of the TXOP. During the TXOP preemption period, an AP (TXOP responder) may schedule DL/UL low latency traffic. In some example embodiments, the TXOP preemption period may not exceed the predetermined time period (e.g., 20% of the TXOP, 1 ms, etc.) or the time period indicated by a MAC Control frame. If an obtained TXOP is shorter than a certain threshold (e.g., <5 ms), a TXOP preemption period may not be assigned within the TXOP.

In some example embodiments, the TXOP preemption period can be used based on membership only. DL/UL low latency frame Only for member STAs that has joined the TXOP preemption membership group can be scheduled by the AP during a TXOP preemption period.

TXOP preemption notification capability can also be negotiated by Association Request/Response frame exchange between an AP and a non-AP STA.

TXOP preemption group can also be negotiated. In order to support TXOP preemption group, broadcast TWT ID can be reused. TWT setup frames can be exchanged between a non-AP STA and an AP for membership subscription, which is dynamic TWT. Dynamic TWT means that a TWT SP for low latency traffic can be allocated dynamically based on TXOP preemption notification. It may be similar to r-TWT membership establishment. Bit(s) indication indicating whether the r-TWT membership is for dynamic or static or both.

A non-AP STA can join a TXOP preemption group by TWT setup frame exchange with an AP. Membership subscription may be optional if TXOP preemption notification is based on STA's capability.

If the member non-AP STA (or TXOP preemption notification capable STA) obtains a TXOP, it transmits to an AP an initial frame indicating TXOP preemption period at the beginning of the TXOP (e.g., the initial frame can be a CTS-to-self frame, an RTS frame, a MAC header or other MAC Control frame indicating TXOP preemption period). The initial frame may include a time period info that can be used for UL/DL low latency traffic scheduling. The time period may not be included, and a predetermined time period (e.g., 1 ms) can be used.

After expiration of the time period, the non-AP STA may transmit its buffered frame (e.g., non-low latency traffic) within the remaining TXOP. The AP may transmit a frame indicating preemption period release to the TXOP holder if it has no UL/DL buffered low latency traffic. Additionally the TXOP holder may transmit a frame during the remaining TXOP. If the non-AP STA has buffered low latency traffic, it may transmit the low latency traffic first and then it may transmit a frame indicating dynamic r-TWT SP in the middle of the TXOP. Conditions to transmit the initial frame can be defined such as: TXOP length is longer than a certain threshold (e.g., 4 ms, 5 ms, etc.); and/or Access Category (AC) associated with the obtained TXOP has lower (or equal) priority than the AC associated with the low latency traffic After receiving the frame indicating TXOP preemption notification, the AP may transmit buffered low latency frame to either member non-AP STAs only or any non-AP STA regardless of dynamic r-TWT membership; or the AP may poll member STAs (or member STAs with high priority and non-member STA with low priority) by sending such as a BSRP Trigger frame. If the AP receives BSR frames with non-zero queue size info (or TXOP duration request) for low latency traffic from the member STAs, the AP may transmit a frame scheduling their UL transmission e.g., using a Basic Trigger frame.

FIGS. 8A, 8B, 8C present example 800 signaling protocols for the TXOP preemption notification. FIG. 8A presents an example of using a modified Control Information subfield format in a CAS Control subfield for signaling the TXOP preemption notification.

FIG. 8B presents an example values for the RDG/More PPDU subfield (introduced in FIG. 8A). Here the RDG/More PPDU subfield in the CAS Control subfield of the HE variant HT Control field are reused. The RDG/More PPDU subfield is set to 1 can be used for TXOP preemption notification. The RDG/More PPDU subfield is set to 0 can be used for TXOP preemption release. Additionally the TXOP Preemption Period subfield can be defined in the CAS Control subfield to indicate a TXOP preemption period for low latency traffic.

FIG. 8C presents an alternate example of using TXOP Preemption Control for signaling the TXOP preemption notification. Here a new HE variant HT Control field (e.g., TXOP Preemption Control) is defined, and includes at least one of: a preemption Period Grant subfield set to 1 indicates the preemption period grant; a preemption Period Release subfield set to 1 indicates the preemption period release; a preemption Period subfield indicates the preemption period (e.g., 0: 0 ms, 1: 0.5 ms, 2: 1 ms, 3-5: reserved); and/or a preemption Group ID subfield indicates Preemption Group ID which preemption period is grant or released. Note. Preemption period grant subfield and Preemption period release subfield can be merged into 1 bit (e.g., the bit set to 1 indicating grant and the bit set to 0 indicating release).

FIGS. 9A, 9B, 9C, 9D, 9E, 9F, 9G introduces and presents examples 900 of using a modified Broadcast TWT Info subfield for signaling TXOP preemption group membership. Here a first option is to reuse TWT Setup frame (e.g., including the Broadcast TWT Info subfield) and define 1 bit (e.g., Dynamic subfield) indicating whether the Broadcast TWT ID is for dynamic TWT. If the bit is set to 1, TWT group member STA may allocate TXOP preemption period within its TXOP so that AP can schedule transmission of low latency traffic for TWT group member STAs during the TXOP preemption period.

A second option is to define a new management frame or action frame including: a preemption group ID, Low Latency Traffic Info (e.g., TID, TSID, etc.); Minimum/Maximum preemption period; Minimum TXOP length for preemption; and/or TXOP Limit for TXOP preemption, where the TXOP Limit can be set differently for TXOP preemption (e.g., if the TXOP Limit is 5 ms and TXOP preemption period is 1 ms, then TXOP Limit for TXOP preemption is 6 ms). Note, these parameters can be included individually addressed frame as well as group addressed frame (e.g., Beacon, Probe Response, etc.).

Figure 9A:
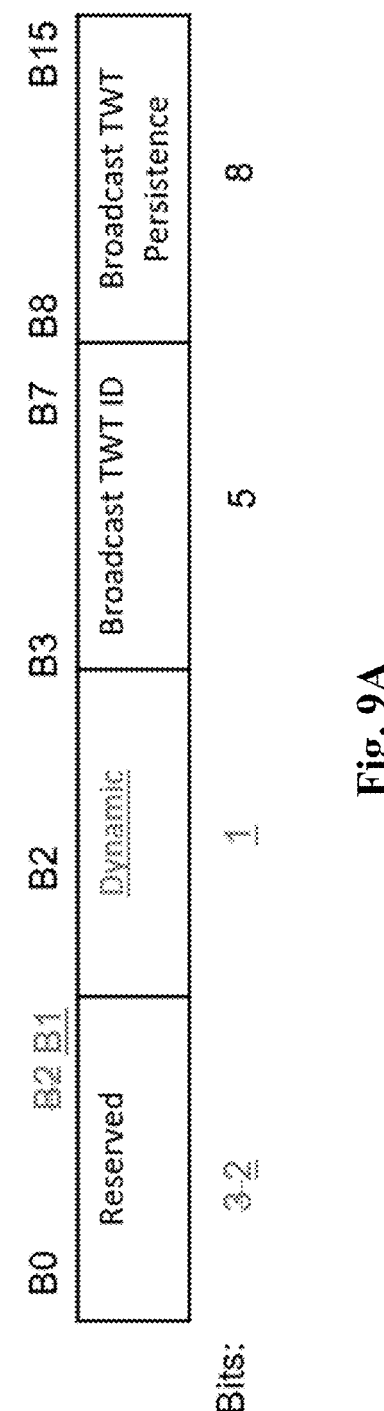
FIGS. 9A, 9B, 9C, 9D, 9E, 9F, 9G introduces and presents examples of using a modified Broadcast TWT Info subfield for signaling TXOP preemption group membership.
Figures 9B, 9C:
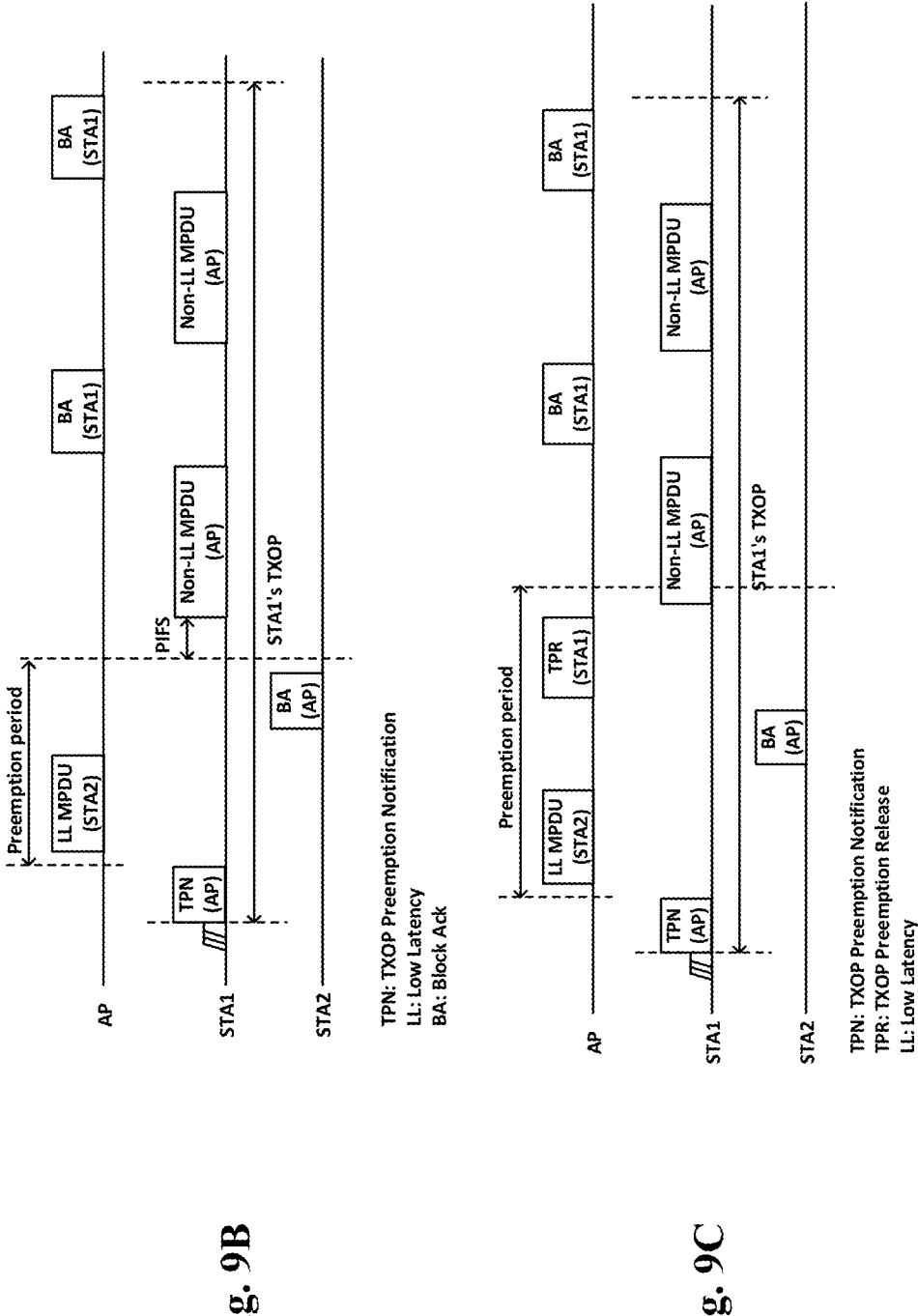

FIG. 9B presents a first example. Here TXOP preemption period is allocated at the beginning of the TXOP by a TXOP holder (e.g., STA1) sending a TXOP Preemption Notification frame. During the allocated TXOP preemption period, an AP transmits downlink low latency traffic to other STA (e.g., STA2). After expiry of TXOP preemption period, the TXOP holder (e.g., STA1) transmit buffered non-low latency traffic using the remaining TXOP. PIFS can be used for the TXOP holder to transmit a frame after preemption period ends.

FIG. 9C presents a second example similar to the first example except that after transmitting buffered low latency traffic, an AP transmits to a TXOP holder (e.g., STA1) a TXOP Preemption Release frame indicating the preemption period release. Upon reception of the TXOP Preemption Release frame, the TXOP holder uses the channel to transmit buffered BUs without expiry of the TXOP preemption period.

Figures 9D, 9E:
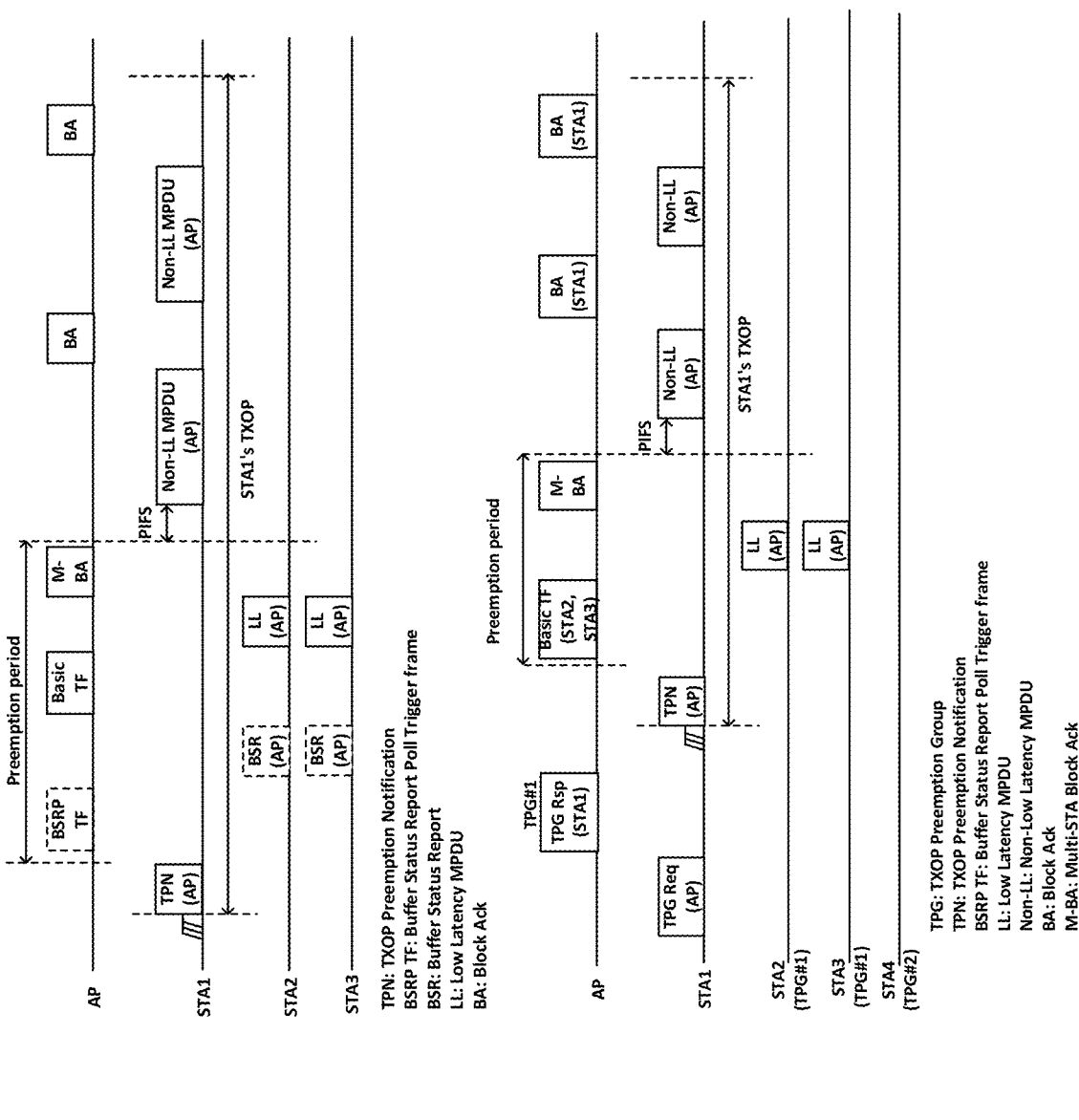

FIG. 9D presents a third example. Here shown is TXOP preemption for uplink low latency traffic scheduling. TXOP preemption period is allocated at the beginning of the TXOP by a TXOP holder (e.g., STA1) sending a TXOP Preemption Notification frame. During the allocated TXOP preemption period, an AP transmits one or more Trigger frame (e.g., BSRP Trigger frame, Basic Trigger frame) to other STAs (e.g., STA2 and STA3) to get STA's buffer status information regarding uplink buffered low latency traffic and/or to allocate uplink resource for the STAs (e.g., STA2 and STA3) to transmit uplink buffered low latency traffic using a trigger-based PPDU. After expiry of TXOP preemption period, the TXOP holder (e.g., STA1) transmit buffered non-low latency traffic using the remaining TXOP. PIFS can be used for the TXOP holder to transmit a frame after preemption period ends FIG. 9E presents a fourth example, membership based TXOP preemption. Here Non-AP STA (e.g., STA1) joins TXOP Preemption Group (e.g., Group ID 1) by exchanging management frame or action frames (e.g., TXOP Preemption Group Request and TXOP Preemption Group Response) with an AP. TXOP Preemption Group Request and Response frame can be TWT Setup frames or new management/action frames.

Figures 9F, 9G:
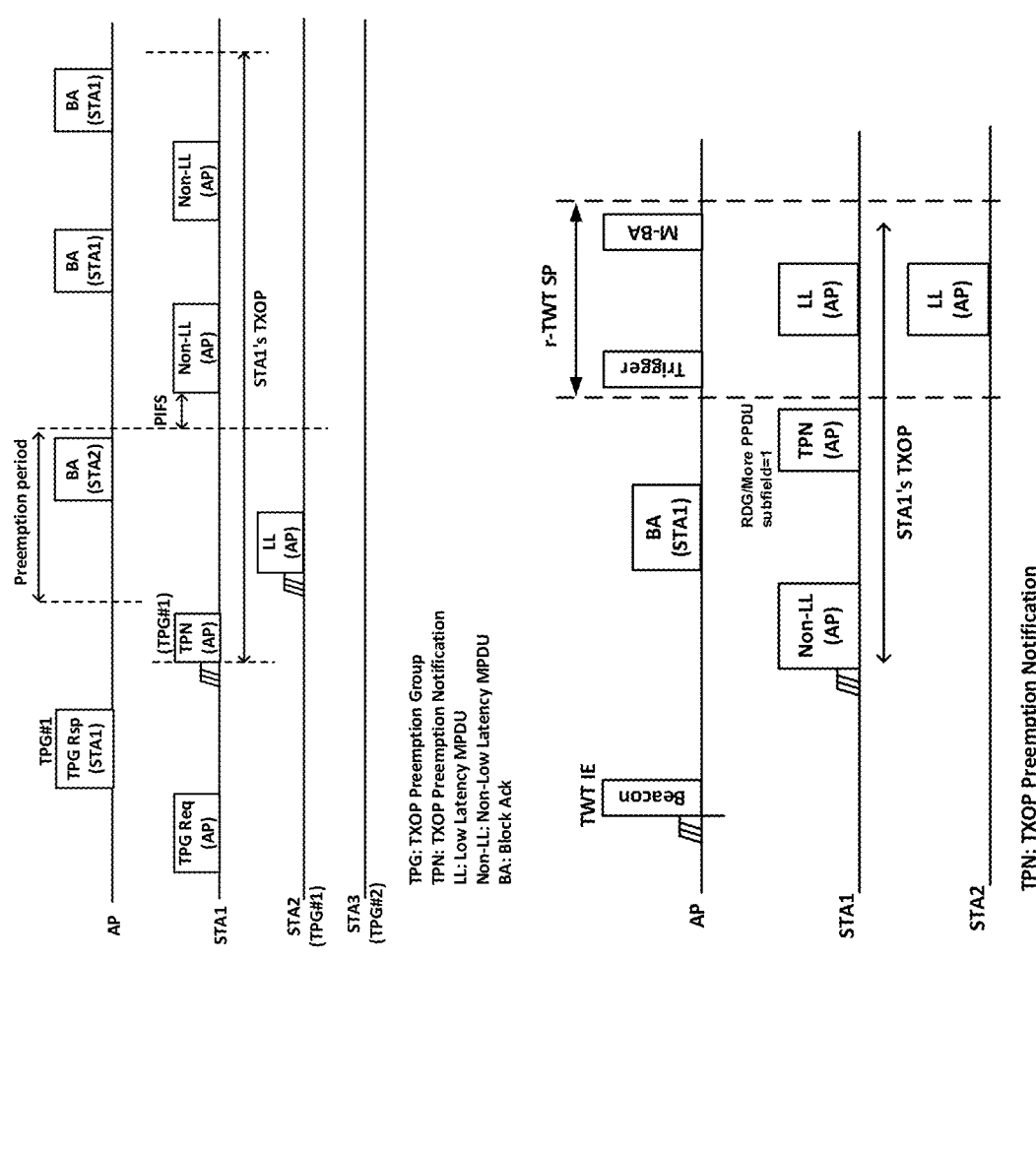

Some STAs (e.g., STA2 and STA3) belong to the same group (Group ID 1) and other STA (e.g., STA4) does not belong to the same group (e.g., Group ID 2). A TXOP holder obtains a TXOP and allocate a TXOP preemption period by sending a TXOP Preemption Notification frame. During the allocated TXOP preemption period, the AP transmits a Basic Trigger frame to the STAs (e.g., STA2, STA3) which belong to the same TXOP preemption group (e.g., Group ID 1) with the TXOP holder and the STAs (e.g., STA2, STA3) transmit uplink buffered low latency traffic using trigger-based PPDUs. After expiry of TXOP preemption period, the TXOP holder (e.g., STA1) transmit buffered non-low latency traffic using the remaining TXOP. PIFS can be used for the TXOP holder to transmit a frame after preemption period ends FIG. 9F presents a fifth example is another membership based TXOP preemption (and contention-based access). Here Non-AP STA (e.g., STA1) joins TXOP Preemption Group (e.g., Group ID 1) by exchanging management frame or action frames (e.g., TXOP Preemption Group Request and TXOP Preemption Group Response) with an AP. TXOP Preemption Group Request and Response frame can be TWT Setup frames or new management/action frames. STA2 belongs to the same group (e.g., Group ID 1) and STA3 does not belong to the same group (e.g., Group ID 2).

A TXOP holder (e.g., STA1) obtains a TXOP and allocate a TXOP preemption period by sending a TXOP Preemption Notification frame. TXOP Preemption Group ID (e.g., Group ID 1) can be indicated either during the allocated TXOP preemption period, a STA (e.g., STA2) belonging to the same group (e.g., Group ID 1) including AP can contends the channel access and transmits low latency traffic, or after expiry of TXOP preemption period, the TXOP holder (e.g., STA1) transmit buffered non-low latency traffic using the remaining TXOP. PIFS can be used for the TXOP holder to transmit a frame after preemption period ends FIG. 9G presents a sixth example. Here in IEEE802.11be r-TWT, a non-AP STA needs to end its transmission and the TXOP before the beginning of an r-TWT SP. A non-AP STA (e.g., TXOP holder) may allocate a TXOP preemption period (or perform RDG) to an AP (e.g., TXOP responder) before the beginning of an r-TWT SP instead of ending its TXOP. This can be done by transmitting a frame (e.g., QoS Null frame) with the RDG/More PPDU subfield in the CAS Control subfield of the HE variant HT Control field set to 1 (e.g., option 1 in slide 9). After receiving the frame with the RDG/More PPDU subfield in the CAS Control subfield of the HE variant HT Control field set to 1, the AP can schedule transmission of DL/UL low latency traffic during the r-TWT SP.

In the above discussion, a preemption indication is provided in an immediate response frame such as a BA frame using a reserved 1-bit indication. However, in many example embodiments other immediate response frames such as the Ack frame and the CTS frame have no reserved bit available that could be used to indicate the TXOP preemption. Now discussed is an alternate preemption indication protocol that uses a Duration/ID field in an Ack/BA frame or a Duration/ID field setting in a CTS frame.

A preemption request can be included in an immediate response such as an Ack frame or a BA frame by a TXOP responder (e.g., AP). However an immediate response frame can be sent in a non-HT (duplicate) PPDU format, which cannot include an A-MPDU (i.e., no aggregation with a QoS Null frame indicating such a preemption request). That is, the Ack frame or the BA frame should include the explicit indication inside the frame by using the existing (sub)field or a reserved field. While the BA frame has a reserved bit, the Ack frame does not.

The existing field in the Ack frame and the BA frame needs to be able to indicate the TXOP preemption of the TXOP responder to the TXOP holder.

Now presented is an approach where the TXOP preemption can be indicated by the TXOP responder (i.e. the AP STA) using an existing field and/or subfield of the MAC header in an immediate response frame. In some example embodiments, the preemption request is made by setting the Duration/ID field in the MAC header to 0. In other example embodiments, the preemption request is made by setting the More Data subfield to 1 and the Duration/ID field to 0.

Figure 10A:
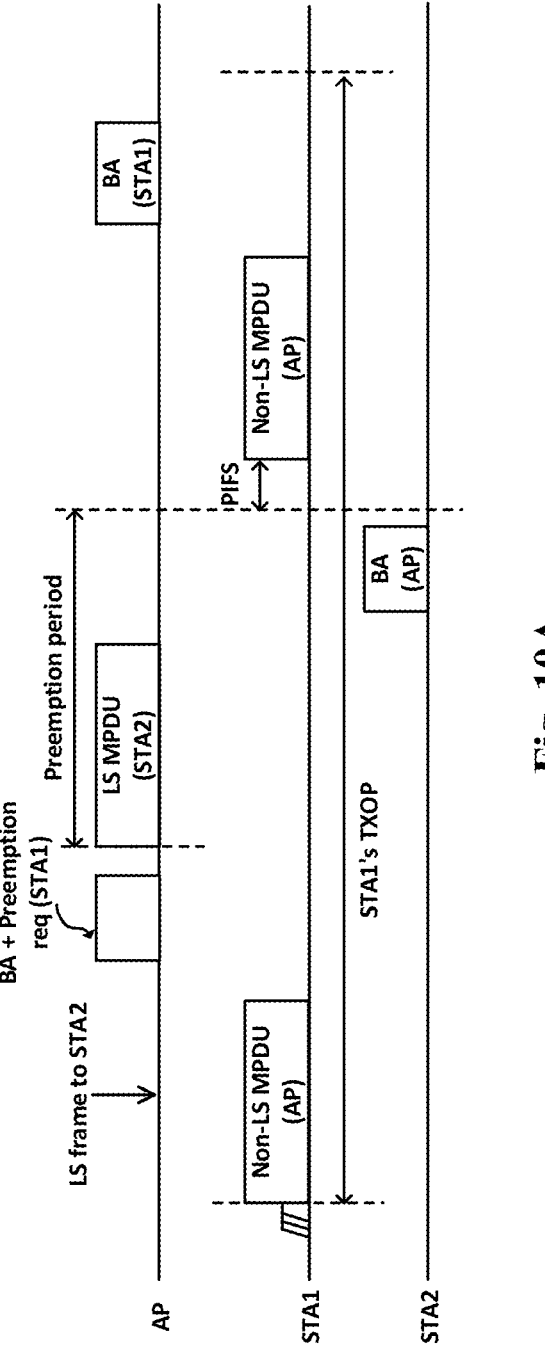
FIGS. 10A, 10B, 10C, 10D introduce and presents example alternate preemption indication protocols.

FIGS. 10A, 10B, 10C, 10D introduce and presents example 1000 alternate preemption indication protocols. FIG. 10A presents an example when a TXOP holder (e.g., STA1) transmits a non-latency-sensitive data frame to a TXOP responder (e.g., AP) and the TXOP responder (e.g., AP) needs to transmit a latency-sensitive data frame to the TXOP holder (e.g., STA1) or to other STA (e.g., STA2), the TXOP responder transmits a preemption request for sending a preemptive PPDU. The preemption request information can be included in a control response frame such as a BA frame, or a QoS Null frame including an HE-Control subfield.

TXOP holder transmits non-latency-sensitive frame. TXOP responder responds with a BA frame including preemption request information, or a BA frame+QoS Null frame indicating preemption request. TXOP responder transmits a latency-sensitive frame to the TXOP holder or to other device. Upon expiration of the time period or receiving of the RDG/More PPDU subfield in the CAS Control subfield set to 0 indicating TXOP preemption release, TXOP holder can transmits the remaining buffered non-latency-sensitive frame to the TXOP responder.

Figure 10B:
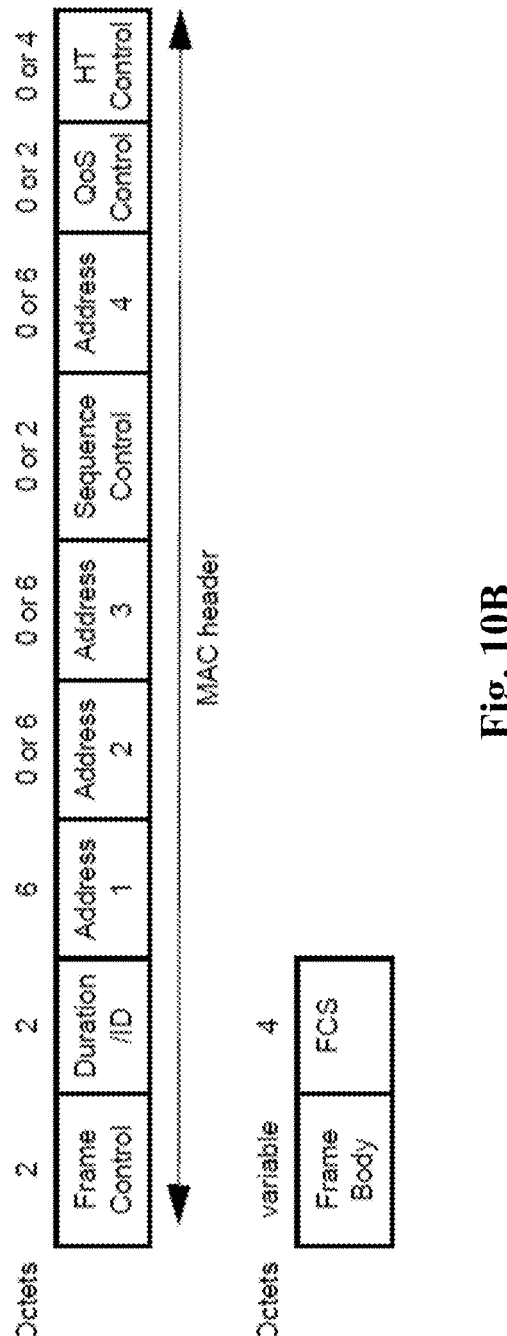

FIG. 10B shows an example Duration/ID field setting in a control response frame. The Duration/ID field of a MAC frame can set a network allocation vector (NAV) value at receiving STAs that protects up to the end of any following Data, Management, or response frame plus any additional overhead frames or up to the estimated end of a sequence of multiple frames.

In a CTS frame transmitted in response to an RTS frame (or an MU-RTS Trigger frame), the Duration/ID field is set to the value obtained from the Duration/ID field of the RTS frame (or the MU-RTS Trigger frame) that elicited the CTS frame minus the time, in microseconds, between the end of the PPDU carrying the RTS frame (or the MU-RTS Trigger frame) and the end of the PPDU carrying the CTS frame.

In an Ack frame, the Duration/ID field is set to the value obtained from the Duration/ID field of the frame that elicited the response minus the time, in microseconds between the end of the PPDU carrying the frame that elicited the response and the end of the PPDU carrying the Ack frame.

In a BA frame transmitted in response to a BAReq frame, MU-BAR Trigger frame, frame containing an implicit block ack request, or frame carried in HE/EHT TB PPDU, the Duration/ID field is set to the value obtained from the Duration/ID field of the frame that elicited the response minus the time, in microseconds between the end of the PPDU carrying the frame that elicited the response and the end of the PPDU carrying the BA frame.

An indication of the TXOP preemption can be included in an immediate response such as an Ack frame or a BA frame by a TXOP responder (e.g., AP). TXOP preemption indication can be sent in a MAC control header (e.g., using a reserved (sub)field or using a newly defined HE Control field).

When an AP transmits the TXOP preemption indication in an immediate response frame such as an Ack frame, a BA frame, a CTS frame, etc. to a TXOP holder (e.g., non-AP STA), it may not be able to include the preemption indication in the immediate response frame if the immediate response frame is sent in a non-HT (duplicate) PPDU due to the following reasons: the non-HT (duplicate) PPDU does not contain the HE Control field (not contain an A-MPDU aggregating with a QoS null frame including the HE Control field); or the Ack frame and the CTS frame has no reserved field for the preemption indication.

Figures 10C, 10D:
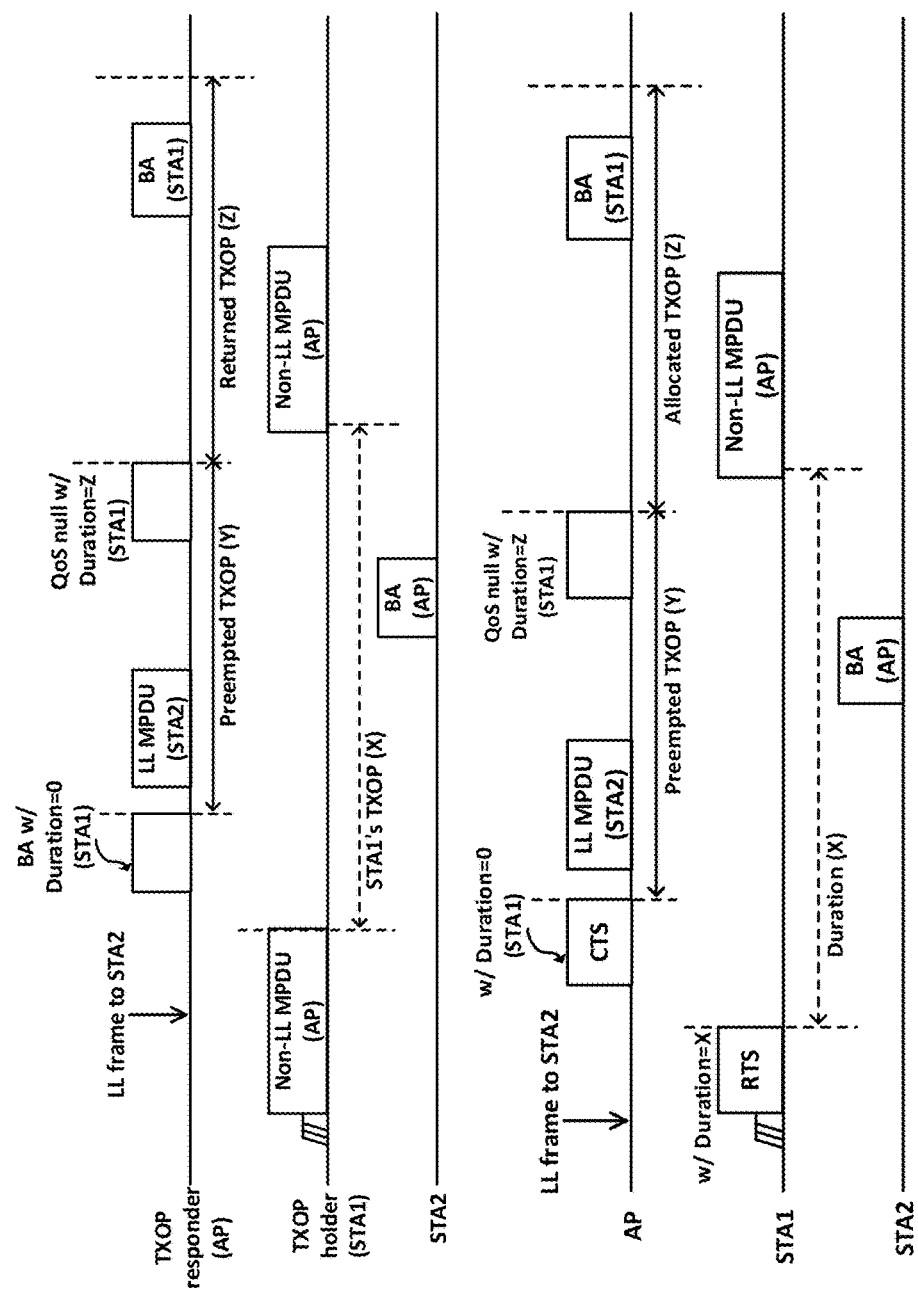

FIGS. 10C, 10D present examples where a TXOP preemption indication in an immediate response frame. Additionally a preemption request can be indicated by a TXOP responder (e.g., the AP STA) using the existing field and/or subfield of the MAC header at least one of the following: the Duration field in the MAC header (e.g., the Duration/ID field set to a specific value (e.g., value 0) transmitted by a TXOP responder (e.g., AP) can indicate the preemption from the TXOP responder for low latency traffic); or the More Data subfield of the Frame Control field and the Duration field in the MAC header (e.g., More Data subfield set to 1 and the Duration/ID field set to a specific value (e.g., value 0) transmitted by a TXOP responder can indicate the preemption from the TXOP responder for low latency traffic.

An immediate response frame with the Duration/ID field (and the More Date subfield) in the MAC header set to specific value(s) as described above can indicate the preemption from the TXOP responder for low latency traffic.

FIG. 10C presents an example of the Duration/ID field setting when TXOP preemption is indicated in an Ack/BA frame. When a TXOP responder preempts a TXOP, the TXOP responder may set the Duration/ID field, in frames that are exchanged for low latency frame transmission, set to a value to protect either the frame exchange sequence for the low latency traffic (e.g., the end of time indicating the value Y) or the TXOP set by the TXOP holder (e.g., the end of the time indicating the value Z).

When a TXOP responder return the TXOP to the TXOP holder, the TXOP responder may set the Duration field, in a frame indicating the TXOP return (e.g., QoS null frame), set to a non-zero value (e.g., the value obtained from the Duration/ID field of the frame that elicited the immediate response frame minus the time, in microseconds between the end of the PPDU carrying the frame that elicited the immediate response frame and the end of the PPDU carrying the Ack/BA frame with the TXOP preemption indication, e.g., the value Z).

For example, a TXOP holder (e.g., non-AP STA) transmits an A-MPDU including the Duration field set to a value to protect a TXOP. In this case, the A-MPDU may solicit an immediate response frame (e.g., Ack, BA frame). A TXOP responder (e.g., AP) that has a buffered low latency frame (e.g., buffered UL and/or DL low latency frame) may transmit the immediate response frame (e.g., Ack or BA frame) that indicates the TXOP preemption for low latency frame transmission (e.g., with the Duration/ID field set to 0). When a TXOP holder receives a BA frame or an Ack frame indicating the TXOP preemption, it does not transmit any frame during the TXOP to the TXOP responder unless it receives a frame indicating the TXOP return.

The TXOP responder may transmit a buffered low latency frame (or transmit a Trigger frame for triggering a low latency frame transmission from another STA) after transmitting the immediate response frame indicating the TXOP preemption. The TXOP responder that completes the buffered low latency frame transmission may return the TXOP to the TXOP holder by transmitting a QoS null frame (e.g., including the RDG/More PPDU subfield in the CAS Control subfield set to 0 (indicating TXOP return) or set to 1 (indicating reverse direction grant). The TXOP holder receiving the frame indicating the TXOP return may resume its transmission to the TXOP responder during the TXOP indicated in the QoS null frame.

FIG. 10D presents an example of the Duration/ID field setting when TXOP preemption is indicated in a CTS frame.

When an AP preempts a TXOP by setting the Duration field in a CTS frame to 0, the AP may set the Duration/ID field in the buffered low latency frame or the Trigger frame to a value that protects either the frame exchange sequence for the low latency traffic (e.g., the end of time indicating the value Y) or the TXOP set by the TXOP holder (e.g., the end of the time indicating the value Z).

When the AP returns/allocates the TXOP to the non-AP STA that sent the RTS frame, the AP may set the Duration field, in a frame indicating the TXOP return/allocation (e.g., QoS null frame), set to a non-zero value (e.g., the value obtained from the Duration/ID field of the RTS frame that elicited the CTS frame minus the time, in microseconds, between the end of the PPDU carrying the RTS frame and the end of the PPDU carrying the QoS Null frame, or the value obtained from the Duration/ID field of the RTS frame that elicited the CTS frame minus the time, in microseconds, between the end of the PPDU carrying the RTS frame and the end of the PPDU carrying the CTS frame, e.g., the value Z).

For example, a non-AP STA may transmit an RTS frame to an AP. The AP that has a buffered low latency frame may respond with a CTS frame indicating the TXOP preemption (e.g., with the Duration/ID field set to 0). After transmitting the CTS frame indicating the TXOP preemption request, the AP may transmit a buffered low latency frame (or transmit a Trigger frame for scheduling of low latency traffic for another STA). After finishing transmission/schedule of low latency traffic, the AP may allocate the time period to the non-AP STA that has sent the RTS frame by transmitting a QoS null frame (e.g., including the RDG/More PPDU subfield in the CAS Control subfield set to 1). The non-AP STA receiving the QoS null frame may exchange one or more frames during the time period indicated in the Duration field in the QoS null frame.

Now discussed is an alternative approach for managing latency-sensitive traffic where an AP is TXOP holder. An AP as a TXOP holder may transmit a pre-emptive PPDU including latency-sensitive A-MPDUs to STA A while it is transmitting a non-latency-sensitive frame to STA B. A control information indicating PPDU pre-emption is included in a pre-empted PPDU including the non-latency-sensitive frame for STA B. The control information can include the Ack Policy Update information indicating Ack Policy of the non-latency-sensitive frame to be changed to Block Ack. The control information can include the target recipient information of the pre-emptive PPDU indicating whether the pre-emptive PPDU is addressed to STA B or not.

Figures 11A, 11B:
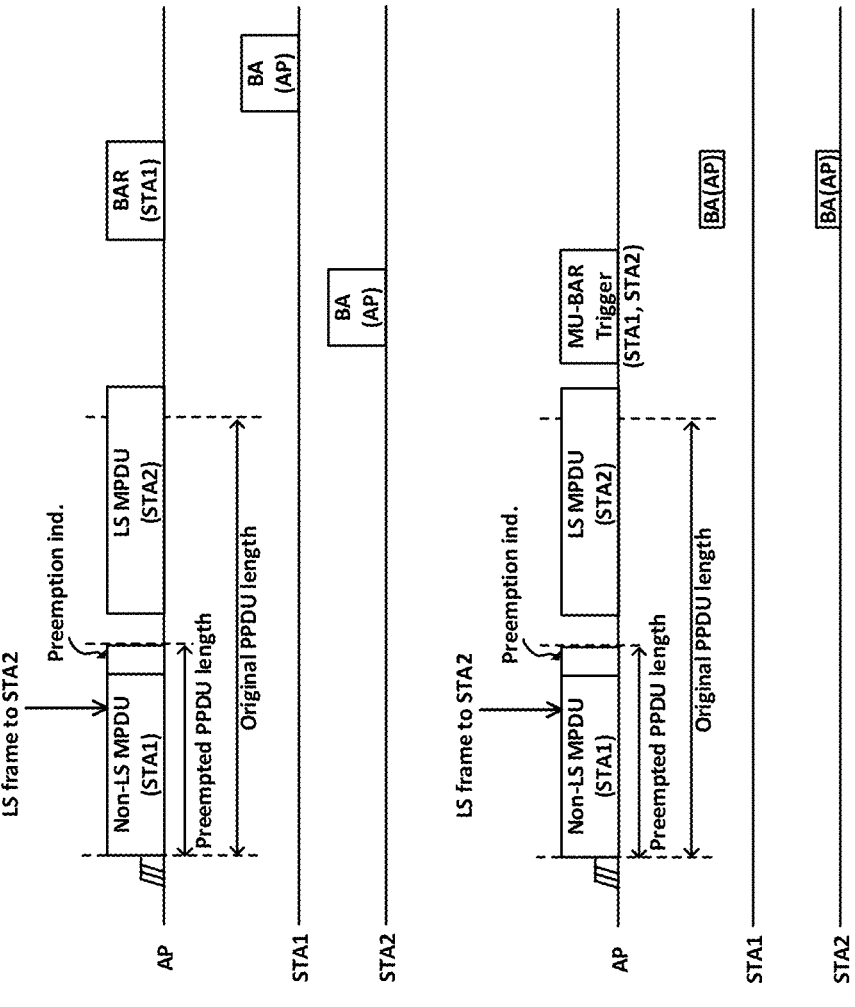
FIGS. 11A, 11B, 11C, 11D, 11E, 11F present examples where an AP is TXOP holder.

FIGS. 11A, 11B, 11C, 11D, 11E, 11F present examples 1100 where an AP is TXOP holder. FIG. 11A is an example of BAR soliciting BA frame from STA1.

FIG. 11B is a first example variation of MU-BAR soliciting BA frames from STA1 and STA2. When an AP as TXOP holder transmits a non-latency-sensitive frame to STA1 and it has buffered latency-sensitive traffic for STA2, the TXOP holder may transmit a separate preemptive PPDU to STA2 for the latency-sensitive traffic. MAC control signaling can be defined to indicate the PPDU preemption.

For example, a new HE-Control subfield can be included in the preempted PPDU. The HE-Control subfield can include further information such as Ack Policy Change (e.g., change Implicit BAR/HETP ACK to BA frame or No Ack frame). Note. It can be implicitly defined as the recipient changes the Ack Policy of Implicit BAR/HETP ACK to BA frame (or No Ack frame) for received MPDUs if the preemption indication is received (e.g., if the preempted PPDU contains either an incomplete MSDU or a MAC Management frame, the Ack Policy corresponding to the MPDU may be changed to No Ack frame instead of BA frame.)

In another example, preemption information can include one bit indication indicating whether the target recipient of the preemptive PPDU is the TXOP responder (STA1) or not. If the target recipient is STA1, Ack Policy may not be changed. STA1 may transmit an M-TID BA frame in response to the received LS MPDU, without receiving a BAR frame; or AP may transmit a Multi-TID Block Ack Request frame (instead of MU-BAR Trigger frame in example 2) to STA1 to solicit a Multi-TID BA frame for both the non-latency-sensitive MPDU and the latency-sensitive MPDU.

Figure 11C:
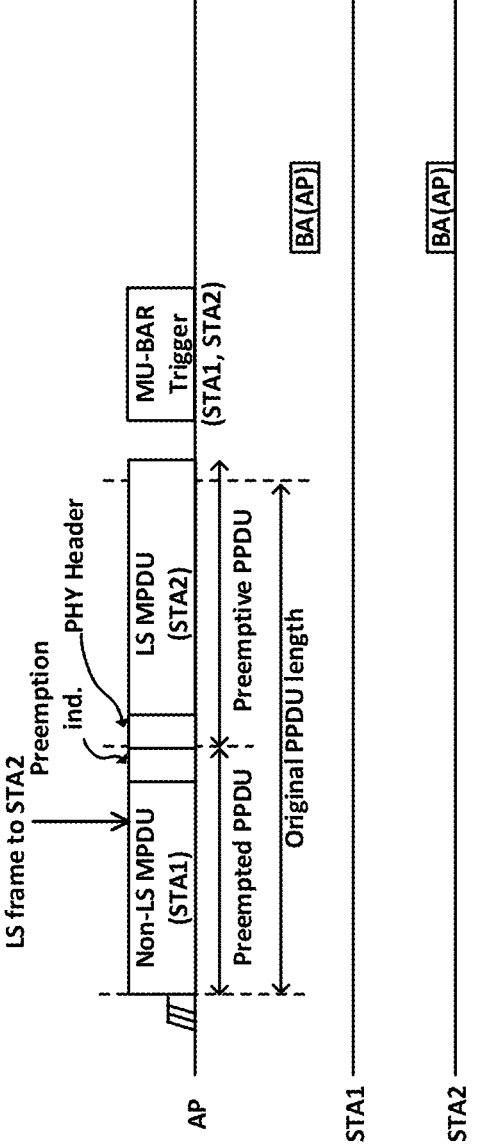

FIG. 11C is a second example variation when a TXOP holder (e.g., AP) transmits a non-latency-sensitive frame to STA1 and it has buffered latency-sensitive traffic for STA2, the TXOP holder may transmit a preemptive PPDU to STA2 for the latency-sensitive traffic.

For example, transmit an aggregated PPDU (A-PPDU). Define "PHY level" indication indicating PPDU preemption to both the recipients of the pre-empted PPDU and of the pre-emptive PPDU. It can be implicitly defined as the recipient changes the Ack Policy of Implicit BAR/HETP ACK to Block Ack for received A-MPDUs in the pre-empted PPDU if the PHY level preemption indication is received (e.g., if the preempted PPDU contains either an incomplete MSDU or a MAC Management frame, the Ack Policy corresponding to the MPDU may be changed to No Ack instead of Block Ack). MU-BAR Trigger frame may be transmitted right after the A-PPDU to trigger BA frames transmission from the recipients of the A-PPDU.

Figures 11D, 11E, 11F:
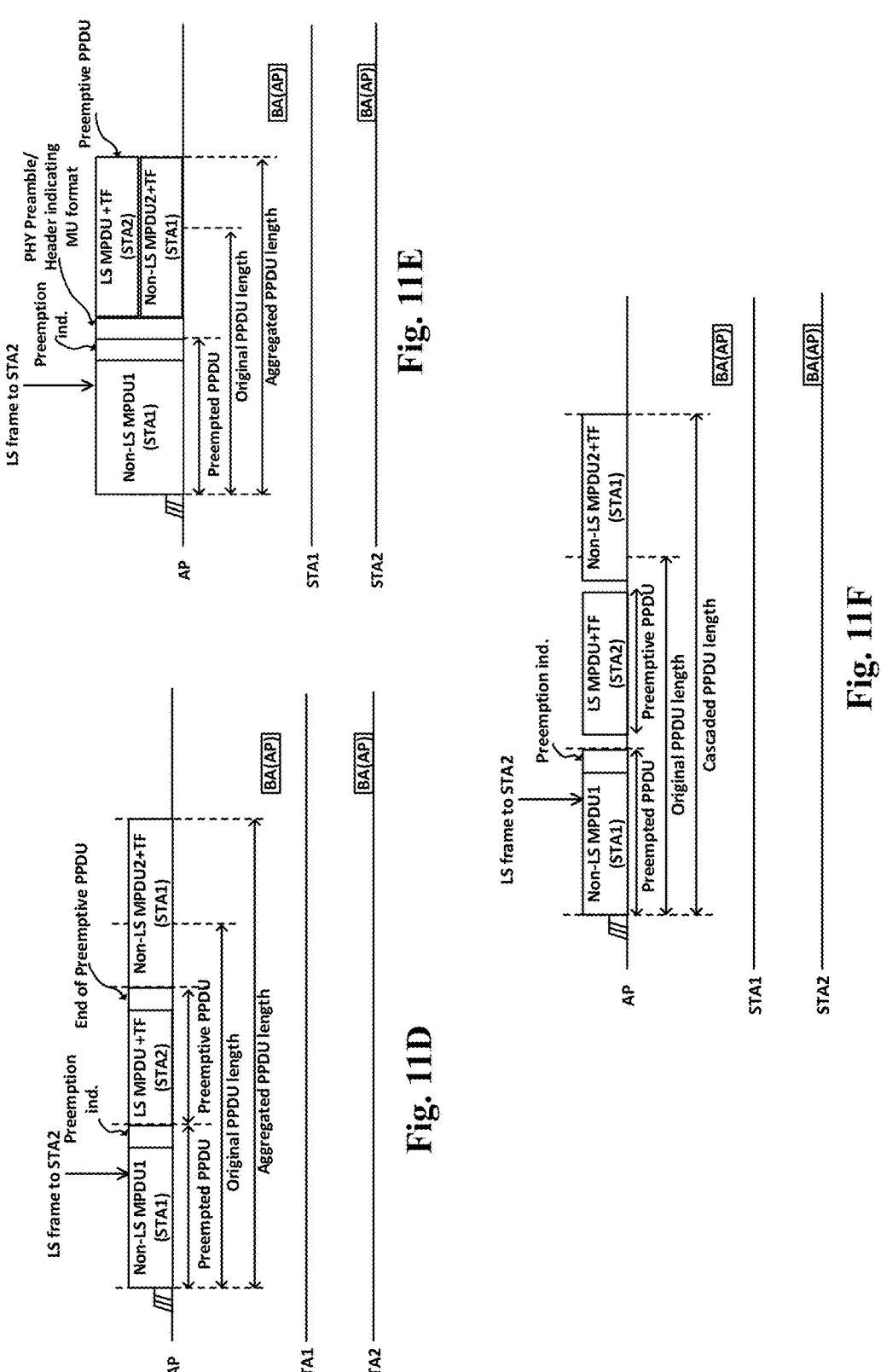

FIGS. 11D, 11E, 11F present a third variation example when a TXOP holder (e.g., AP) transmits a non-latency-sensitive frame to STA1 and it has buffered latency-sensitive traffic for STA2, the TXOP holder may transmit a preemptive PPDU to STA2 for the latency-sensitive traffic and transmit the remaining non-latency-sensitive frame to STA1.

For example, transmit an aggregated PPDU (A-PPDU). A-PPDU may consist of multiple PPDUs with time domain and frequency domain as shown in the example of proposal 1-3A and 1-3B. Define "PHY level" indication indicating PPDU preemption to both the recipients of the pre-empted PPDU and of the pre-emptive PPDU. It can be implicitly defined as the recipient changes the Ack Policy of Implicit BAR to HETP ACK for received A-MPDUs in the pre-empted PPDU if the PHY level preemption indication is received (e.g., if the preempted PPDU contains either an incomplete MSDU or a MAC Management frame, the Ack Policy corresponding to the MPDU may be changed to No Ack instead of Block Ack).

Preemptive PPDU and a PPDU including the remaining non-latency-sensitive frame can include a trigger frame to trigger BA frames transmission from the recipients of the A-PPDU (e.g., STA1 and STA2). STA1 may transmit a BA frame indicating ack information for the non-latency-sensitive MPDU1 and MPDU2 in response to the trigger frame as shown in earlier FIGS. 11A, 11B, 11C.

Transmit cascaded PPDU (C-PPDU). A preempted PPDU and a preemptive PPDU can be transmitted separately but with a shorter interframe space (e.g., RIFS). It can be implicitly defined as the recipient changes the Ack Policy of Implicit BAR to HETP ACK for received A-MPDUs in the pre-empted PPDU if the preemption indication is received. Preemptive PPDU and a PPDU including the remaining non-latency-sensitive frame can include a trigger frame to trigger BA frames transmission from the recipients of the cascaded PPDU (e.g., STA1 and STA2). STA1 may transmit a BA frame indicating ack information for the non-latency-sensitive MPDU1 and MPDU2 in response to the trigger frame as shown above.

Instead of transmitting trigger frames in the A-PPDU or the C-PPDU, AP may transmit a MU-BAR or BAR frames separately to the recipients (e.g., STA1 and STA2) and the recipients may transmit BA frames in response to the MU-BAR or the BAR frames.

Additionally in various example embodiments, Intra-PPDU PS (power save) is disabled during using the previously discussed PPDU preemption protocols. For example, when an AP transmits a non-latency-sensitive data frame to STA1 and it has newly buffered latency-sensitive traffic for STA2, the AP may transmit a preemptive PPDU to STA2 while it suspends transmission of the non-latency-sensitive data frame to STA1. STA2 that operates in Intra-PPDU power save may not be able to receive the preemptive PPDU from the AP upon identifying the Intra-PPDU addressed to STA1.

One solution is to disable the Intra-PPDU PS (power save) for a non-AP STA (e.g., STA2 in previous slides) which supports reception of the preemptive PPDU. In addition, Intra-PPDU Power Save can be disabled when the non-AP STA (e.g., STA2) receives a downlink Intra-BSS PPDU addressed to other non-AP STA (e.g., STA1).

Such a disabling technique can be specifically implemented as follows. A non-AP UHR STA that has dot11IntraPPDUPowerSaveOptionActivated equal to true and dot11PPDUPreemptionOptionImplemented equal to false operates in Intra-PPDU power save mode. A non-AP UHR STA that is in Intra-PPDU power save mode may enter the doze state or become unavailable until the end of a PPDU currently being received if one of the following conditions is met: The PPDU is an UHR PPDU where the RXVECTOR parameter BSS_COLOR is the BSS color of the BSS in which the STA is associated, the RXVECTOR parameters STA_ID do not include the identifier of the STA or the broadcast identifier(s) intended for the STA, and the BSS Color Disabled subfield is 0 in the most recently received HE Operation element from the AP with which it is associated unless the RXVECTOR parameter UPLINK FLAG is 0.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A method of preemption for latency-sensitive traffic for communications between WLAN (wireless local area network) devices, comprising:

receiving, by an access point (AP), a first frame from a first non-access point station (non-AP STA);

transmitting, by the AP, a second frame indicating Transmission Opportunity (TXOP) pre-emption information to the first non-AP STA; and transmitting, to a second non-AP STA, a third frame;

wherein the third frame includes latency-sensitive frame;

wherein the AP transmits a fourth frame indicating TXOP preemption release to the first non-AP STA after successful transmission of the third frame.

2. The method of claim 1:
wherein the TXOP pre-emption information is included in a BlockAck (BA) frame in response to the first frame.

3. The method of claim 1:
wherein the TXOP pre-emption information is included in a QoS Null frame; and
wherein the QoS Null frame includes an HE-Control subfield.

4. The method of claim 1:
further comprising that the first non-AP STA suspends its frame transmission after receiving the second frame indicating TXOP preemption information.

5. The method of claim 1:
further comprising that the first non-AP STA resumes its transmission after receiving the fourth frame from the AP.

6. The method of claim 1, further comprising:
obtaining, by the first non-AP STA, a TXOP;
transmitting, by the first non-AP STA to the AP, a first frame indicating a time period;
wherein the time period is allocated for the AP to schedule a downlink or uplink low latency traffic transmission; and
transmitting, by the first non-AP STA to the AP, a second frame that has been buffered at the first non-AP STA during the TXOP, when the time period has expired or a third frame indicating a release of the time period is received.

7. The method of claim 6:
wherein the time period is allocated at a beginning of the TXOP or at a beginning of a restricted target wake time service period.

8. The method of claim 6:
wherein the time period is less than a predetermined time period within the TXOP.

9. The method of claim 6:
wherein the first frame is a QoS Null frame that includes a HE-Control subfield.

10. The method of claim 6:
wherein the first frame is transmitted when the TXOP length is longer than a predetermined time period.

11. The method of claim 6:
wherein the third frame is a QoS Null frame that includes a HE-Control subfield.

12. The method of claim 6:
further comprising, transmitting the first frame, by the non-AP STA, based on group or membership subscription.

13. The method of claim 12:
wherein the first or second non-AP STAs belong to a same group or membership.

14. The method of claim 1, further comprising:
receiving, by the AP from the first non-AP STA, a first frame indicating a time period;
wherein the time period is allocated within a TXOP for the AP to schedule a downlink or uplink low latency traffic transmission;
transmitting, by the AP, downlink low latency traffic or a trigger frame to solicit uplink low latency traffic from the first non-AP STA or the second non-AP STA during the time period; and
receiving by the AP from the first non-AP STA, a second frame that has been buffered at the first non-AP STA during the TXOP when the time period has expired or a third frame indicating a release of the time period is transmitted.

15. The method of claim 1, further comprising:
receiving, by the AP, a first frame from the first non-AP STA, wherein the first frame solicits an immediate control response frame;
transmitting, by the AP, a second frame including a TXOP pre-emption indication to the first non-AP STA, wherein the second frame is the immediate control response frame;
transmitting, by the AP, to the second non-AP STA a third frame, wherein the third frame includes low latency frame; and
transmitting, by the AP, to the first non-AP STA a fourth frame, wherein the fourth frame indicates TXOP return to the first non-AP STA.

16. The method of claim 15:
wherein the TXOP pre-emption information is included in at least one of the following immediate response frames in response to the first frame: an Ack frame; a BA (BlockAck) frame; or a CTS frame.

17. The method of claim 15:
wherein the TXOP pre-emption indication is indicated in at least one of the following MAC control header field and/or subfield: a duration field; and/or a duration/id field and a more data subfield.

18. The method of claim 17:
wherein the duration/id field is set to 0 and/or the more data subfield is set to 1.

19. A method comprising:
transmitting, to a first non-access point station (non-AP STA), a first frame, wherein the first frame includes non-latency-sensitive frame;
transmitting, to the first non-AP STA, a second frame indicating a PHY Protocol Data Unit (PPDU) pre-emption information; and
transmitting, to a second non-AP STA, a third frame, wherein the third frame includes latency-sensitive frame;
wherein the second frame is a QoS Null frame including an HE-Control subfield.

20. The method of claim 19:
wherein the first frame and the second frame are carried in a same PPDU.

21. The method of claim 19:
wherein the PPDU pre-emption information includes Ack Policy update information indicating the Ack Policy of the first frame being changed to Block Ack (BA).

22. The method of claim 19:
wherein the PPDU pre-emption information includes target recipient information of the third frame indicating whether the second non-AP STA is the same in a same group as the first non-AP STA.

23. A first WLAN (wireless local area network) device configured as an access point (AP), comprising:
a controller configured define a preemption protocol for latency-sensitive traffic;
wherein the controller is further configured to:
receive a first frame from a first non-access point station (non-AP STA), wherein the first frame is a non-latency-sensitive frame;
transmit a second frame indicating Transmission Opportunity (TXOP) pre-emption information to the first non-AP STA; and transmit to a second non-AP STA, a third frame, wherein the third frame includes latency-sensitive frame;

wherein the first non-AP STA obtained a TXOP;

wherein the AP is configured to receive from the first non-AP STA a first frame indicating a time period;

wherein the time period is allocated for the AP to schedule a downlink or uplink low latency traffic transmission; and wherein the AP is configured to receive from the first non-AP STA a second frame that has been buffered at the first non-AP STA during the TXOP, when the time period has expired or after the AP transmits a third frame indicating a release of the time period.

* * * * *